(12) United States Patent
Huang et al.

(10) Patent No.: US 12,483,650 B2
(45) Date of Patent: Nov. 25, 2025

(54) NETWORK ICON DISPLAY METHOD AND TERMINAL

(71) Applicant: Honor Device Co., Ltd., Shenzhen (CN)

(72) Inventors: Caihua Huang, Shenzhen (CN); Zhenrong Wei, Shenzhen (CN); Li Shen, Shenzhen (CN); Qiao Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 459 days.

(21) Appl. No.: 17/913,579

(22) PCT Filed: Mar. 4, 2021

(86) PCT No.: PCT/CN2021/079136
§ 371 (c)(1),
(2) Date: Sep. 22, 2022

(87) PCT Pub. No.: WO2021/190270
PCT Pub. Date: Sep. 30, 2021

(65) Prior Publication Data
US 2023/0135450 A1    May 4, 2023

(30) Foreign Application Priority Data
Mar. 25, 2020   (CN) .......................... 202010220033.2

(51) Int. Cl.
*H04M 1/72469* (2021.01)
*H04W 60/00* (2009.01)

(52) U.S. Cl.
CPC ....... *H04M 1/72469* (2021.01); *H04W 60/00* (2013.01)

(58) Field of Classification Search
CPC . H04M 1/72469; H04W 60/00; H04W 60/04; H04L 5/0098
See application file for complete search history.

(56) References Cited

U.S. PATENT DOCUMENTS 9,467,845 B1 * 10/2016 Rastogi ................... H04W 8/14
9,615,295 B2    4/2017 Kim et al.
(Continued)

FOREIGN PATENT DOCUMENTS

CN        106068658 A     11/2016
CN        109429360 A      3/2019
(Continued)

OTHER PUBLICATIONS

MediaTek Inc., "On 5G Indicators", SA WG2 Meeting #122, S2-174624, Mar. 27-31, 2017, San José del Cabo, MX, 4 pages.
(Continued)

*Primary Examiner* — Dhaval V Patel
(74) *Attorney, Agent, or Firm* — Conley Rose, P.C.

(57) ABSTRACT

A network icon display method and a terminal, in which display of a 5G network icon can be more consistent with an actual network status of a terminal, a quantity of times of switching of a network icon can be reduced, and user experience can be improved. A terminal registers with a first cell, which is a long term evolution LTE cell. If a new radio secondary cell group (NR SCG) is established after registering with the first cell, the terminal displays a 5G network icon, and the terminal displays the 5G network icon after the NR SCG is deleted. If a NR SCG is not established after registering with the first cell, the terminal displays a 4G network icon.

20 Claims, 17 Drawing Sheets

(56) References Cited

U.S. PATENT DOCUMENTS

| | | | |
|---|---|---|---|
| 10,045,286 | B2 | 8/2018 | Huang et al. |
| 10,834,774 | B1 * | 11/2020 | Haberman ............ H04W 16/32 |
| 11,343,694 | B2 | 5/2022 | Lee et al. |
| 11,452,157 | B2 * | 9/2022 | Laselva ................ H04W 76/15 |
| 11,464,063 | B2 | 10/2022 | Li et al. |
| 2019/0379469 | A1 | 12/2019 | Lu et al. |
| 2020/0120214 | A1 * | 4/2020 | Yan .................... H04L 12/1407 |
| 2022/0078877 | A1 | 3/2022 | Lee et al. |
| 2022/0159569 | A1 | 5/2022 | Yuan et al. |

FOREIGN PATENT DOCUMENTS

| | | |
|---|---|---|
| CN | 109561447 A | 4/2019 |
| CN | 110545565 A | 12/2019 |
| CN | 110622575 A | 12/2019 |
| CN | 110662279 A | 1/2020 |
| CN | 110691392 A | 1/2020 |
| CN | 110784897 A | 2/2020 |
| CN | 110839106 A | 2/2020 |
| CN | 110856209 A | 2/2020 |
| CN | 111246543 A | 6/2020 |
| CN | 111669805 A | 9/2020 |
| CN | 111787562 A | 10/2020 |
| RU | 2659573 C2 | 7/2018 |
| WO | 2020030278 A1 | 2/2020 |
| WO | 2020042181 A1 | 3/2020 |

OTHER PUBLICATIONS

The GSMA Future Networks Programme 5GStatus Indicator task force(5GSI), "LSReply to 3GPP RAN on Requirements for NRcarrier frequency mismatchin 5G status indication," 3GPP TSG-CT Meeting #86, CP-193243, Dec. 2, 2019, 3 pages.

GSMA, "LS Reply to 3GPP SA2 on Status Icon related to 5G," SA WG2 Meeting #S2-124, S2-178933, Nov. 27-Dec. 1, 2017, Reno, Nevada, USA, 4 pages.

Qualcomm Incorporated, et al., "Consideration on the GSMA NR indication requirements," 3GPP TSG-RAN WG2 Meeting #101, R2-1803664, Athens, Greece, Feb. 26-Mar. 2, 2018, 3 pages.

GSMA, "LS Reply to 3GPP SA2 on Status Icon related to 5G", 3GPP TSG RAN WG2#100, R2-1713952, Reno, Nevada, USA, Nov. 27-Dec. 1, 2017, 4 pages.

Sprint, "LTE upperLayerIndication IE and application to 5G icon", 3GPP TSG-RAN WG2 Meeting #107, R2-1910799, Prague, Czech Republic, Aug. 26-30, 2019, 6 pages.

* cited by examiner

NETWORK ICON DISPLAY METHOD AND TERMINAL

CROSS-REFERENCE TO RELATED APPLICATIONS

This application is a U.S. National Stage of International Application No. PCT/CN2021/079136 filed on Mar. 4, 2021, which claims priority to Chinese Patent Application No. 202010220033.2, filed with the China National Intellectual Property Administration on Mar. 25, 2020, both of which are incorporated herein by reference in their entireties.

TECHNICAL FIELD

Embodiments of this application relate to the field of electronic technologies, and in particular to a network icon display method and a terminal.

BACKGROUND

With development of mobile communications technologies, the 5th generation (5th generation, 5G) mobile communications technology has become a mainstream trend of current mobile communication. In an initial stage of 5G networking, a non-standalone (non-standalone, NSA) networking mode is mostly used for network construction. A 4th generation mobile communications technology (4th generation mobile communications technology, 4G) network and a 5G network are involved in the NSA networking mode. How to display a 5G network icon and a 4G network icon on a terminal side such as a mobile phone is currently a hot issue in the research of NSA networking.

SUMMARY

Embodiments of this application provide a network icon display method and a terminal, so that display of a 5G network icon can be more consistent with an actual network status of a terminal, a quantity of times of switching of a network icon can be reduced, and user experience can be improved.

To achieve the foregoing objectives, embodiments of this application use the following technical solutions.

According to one aspect, an embodiment of this application provides a network icon display method. The method may be applied to a terminal. A new radio secondary cell group NR SCG is added to the terminal after the terminal registers with a first cell for the first time, where the first cell is a long term evolution LTE cell. The method includes: The terminal registers with the first cell for the second time, where an interval between a time point of registering with the first cell for the second time and a time point of registering with the first cell for the first time is less than or equal to preset duration T. The terminal displays a 5G network icon.

In this solution, because a network environment of the first cell is stable in a short period of time and does not easily change greatly, if the terminal registers with the first cell again within the preset duration T after a network side adds the NR SCG to the terminal, that is, the terminal establishes a dual connectivity, the terminal in the first cell may still have signal coverage of an NR base station, have a dual connectivity capability, and have a capability of using a 5G network. When the terminal processes a service, the terminal has a condition for using the 5G network for service processing through the dual connectivity, so that a terminal interface can display the 5G network icon. Unlike the CONFIG D solution in which a user does not actually use the 5G network when the 5G network icon is displayed, in this solution, the 5G network icon can well match a 5G network capability of the terminal in the first cell, so that the 5G network icon is displayed more accurately.

In a possible design, if the NR SCG has not been added to the terminal in the first cell within the previous preset duration T, for example, the interval between the time point at which the terminal registers with the first cell for the second time and the time point at which the terminal registers with the first cell for the first time is greater than the preset duration T, or the NR SCG has not been previously added to the terminal in the first cell, the method further includes: The terminal enters a connected state. The terminal displays the 5G network icon if the NR SCG is added. The terminal continues displaying the 5G network icon after the NR SCG is deleted. Alternatively, the terminal displays a 4G network icon if the NR SCG is not added.

In this solution, if the terminal determines that the NR SCG has not been added in the first cell within the previous preset duration T, that is, the dual connectivity has not been established, the terminal cannot directly display the 5G network icon. Then, after the terminal enters the connected state, the terminal determines, based on whether the network side adds the NR SCG to the terminal, that is, whether the terminal establishes the dual connectivity, whether to display the 5G network icon or the 4G network icon.

In another possible design, after the NR SCG is added to the terminal in the first cell, the terminal stores an identity of the first cell in a whitelist, and starts a timer corresponding to the first cell. After the timer corresponding to the first cell exceeds the preset duration T, the terminal deletes the identity of the first cell from the whitelist.

In another possible design, if the NR SCG has not been added to the terminal in the first cell within the previous preset duration T, for example, the interval between the time point of registering with the first cell for the second time and the time point of registering with the first cell for the first time is greater than the preset duration T, or the NR SCG has not been previously added to the terminal in the first cell, the method further includes: The terminal enters an idle state. The terminal displays the 5G network icon if the first cell supports a non-standalone NSA networking mode. Alternatively, the terminal displays the 4G network icon if the first cell does not support an NSA networking mode.

In this solution, if the NR SCG has not been added to the terminal in the first cell within the previous preset duration T, that is, the dual connectivity has not been established, the terminal cannot directly display the 5G network icon. Then, after the terminal enters the idle state, the terminal determines, based on whether the first cell supports the NSA networking mode, whether to display the 5G network icon or the 4G network icon.

In addition, an embodiment of this application provides a network icon display method. The method may be applied to a terminal. A new radio secondary cell group NR SCG is added to the terminal after the terminal registers with a first cell for the first time, and the first cell is a long term evolution LTE cell. The method includes: The terminal registers with the first cell for the second time. The terminal displays a 5G network icon.

In this solution, after a network side adds the NR SCG to the terminal, that is, after the terminal establishes a dual connectivity, if the terminal registers with the first cell again, the terminal in the first cell may still have signal coverage of an NR base station, have a dual connectivity capability, and have a capability of using a 5G network. When the terminal processes a service, the terminal has a condition for using the 5G network for service processing through the dual connectivity, so that a terminal interface can display the 5G network icon. In this solution, the 5G network icon can well match a 5G network capability of the terminal in the first cell, so that the 5G network icon is displayed more accurately.

In addition, an embodiment of this application provides a network icon display method, including: A terminal registers with a first cell, where the first cell is a long term evolution LTE cell. The terminal displays a 5G network icon if an NR SCG is added. The terminal continues displaying the 5G network icon after the NR SCG is deleted. Alternatively, the terminal displays a 4G network icon if an NR SCG is not added.

In this solution, after the terminal registers with the first cell, when a network side does not add the NR SCG to the terminal, that is, the terminal does not establish a dual connectivity, the terminal in the first cell may not have signal coverage of an NR base station, a dual connectivity capability, and a capability of using a 5G network, so that the terminal displays the 4G network icon. When the network side adds the NR SCG to the terminal, that is, the terminal establishes the dual connectivity, it may indicate that the terminal has the signal coverage of the NR base station, the dual connectivity capability, and the capability of using the 5G network, so that the terminal can continuously display the 5G network icon when the terminal does not move out of the first cell, that is, continuously registers with (or camps on) the first cell.

In a possible design, that the terminal continues displaying the 5G network icon after the NR SCG added by the network side to the terminal is deleted includes: After the NR SCG added by the network side to the terminal is deleted, the terminal enters a connected state or an idle state, and continues displaying the 5G network icon.

To be specific, after the terminal breaks the dual connectivity, provided that the terminal does not move out of the first cell and still camps on the first cell, the terminal can continue displaying the 5G icon regardless of whether the terminal enters the connected state or the idle state.

In addition, an embodiment of this application provides a network icon display method, including: A terminal registers with a first cell, where the first cell is a long term evolution LTE cell. After the terminal initiates a first service and enters a connected state, the terminal displays a 5G network icon if the first cell supports an NSA networking mode; or the terminal displays a 4G network icon if the first cell does not support an NSA networking mode. Alternatively, after the terminal initiates a second service and enters a connected state, the terminal displays a 5G network icon if an NR SCG is added; or the terminal displays a 4G network icon if an NR SCG is not added.

For example, the first service includes an attachment (Attachment) service, a tracking area update (tracking area update, TAU) service, an SMS message receiving/sending service, or an MSM message receiving/sending service.

In this solution, after the terminal initiates the connected state through the second service, if the terminal establishes a dual connectivity, a terminal interface displays the 5G network icon; and if the terminal interface displays the 5G network icon, it may indicate that when processing the second service, the terminal establishes the dual connectivity and uses a 5G network. Therefore, there is no case in which a user does not actually use the 5G network when the 5G network icon is displayed, and user experience is good. The 5G network icon can well match a 5G network capability in the first cell, so that the 5G network icon is displayed more accurately, which is more consistent with an actual network status of the terminal.

In a possible design, after the terminal registers with the first cell, the method further includes: The terminal enters an idle state. The terminal displays the 5G network icon if the first cell supports the NSA networking mode. Alternatively, the terminal displays the 4G network icon if the first cell does not support the NSA networking mode.

Because a probability that the first cell supports the NSA networking mode is high, a probability that the terminal displays the 5G network icon in the idle state is also high. For the first service, if the 5G network icon is also displayed after the dual connectivity is established in the connected state, and the 4G network icon is displayed when the dual connectivity is not established, after the first service triggers the terminal to enter the connected state, the terminal displays the 4G network icon because the dual connectivity is not established, and the terminal enters the idle state again after the first service quickly ends. If the terminal determines that the first cell supports the NSA networking mode, the terminal displays the 5G network icon again, so that the terminal frequently switches between the 5G network icon and the 4G network icon. In this solution, a case in which the terminal frequently switches between a first icon and a second icon in this case can be avoided.

In addition, an embodiment of this application provides a network icon display method, including: A terminal registers with a first cell, where the first cell is a long term evolution LTE cell. The terminal enters a connected state. The terminal displays a 5G network icon if the terminal detects an NR signal. Alternatively, the terminal displays a 4G network icon if the terminal does not detect an NR signal.

Unlike the CONFIG D solution in which a user does not actually use a 5G network when the 5G network icon is displayed, in this solution, if the terminal detects the NR signal when the terminal processes a service in the connected state, it indicates that an area in which the terminal is located has coverage of the NR signal, and the terminal has a 5G communication capability, can use the 5G network, and therefore can display the 5G network icon. In this solution, the 5G network icon can well match a 5G network capability of the terminal in the first cell, so that the 5G network icon is displayed more accurately, which is more consistent with an actual network status of the terminal.

In a possible design, after the terminal registers with the first cell, the method further includes: The terminal enters an idle state. The terminal displays the 5G network icon if the first cell supports an NSA networking mode. Alternatively, the terminal displays the 4G network icon if the first cell does not support an NSA networking mode.

In this solution, after the terminal registers with the first cell, if the terminal enters the idle state, the terminal may determine, based on whether the first cell supports the NSA networking mode, whether to display the 5G network icon or the 4G network icon.

In addition, an embodiment of this application provides a terminal. A new radio secondary cell group NR SCG is added to the terminal after the terminal registers with a first cell for the first time, and the first cell is a long term evolution LTE cell. The terminal includes: a screen, configured to display a network icon; one or more processors; a memory; and one or more computer programs, where the one or more computer programs are stored in the memory, the one or more computer programs include instructions, and when the instructions are executed by the terminal, the terminal is enabled to perform the following steps: registering with the first cell for the second time, where an interval between a time point of registering with the first cell for the second time and a time point of registering with the first cell for the first time is less than or equal to preset duration T; and displaying a 5G network icon.

In a possible design, if the NR SCG has not been added in the first cell within the previous preset duration T, for example, the interval between the time point of registering with the first cell for the second time and the time point of registering with the first cell for the first time is greater than the preset duration T, or the NR SCG has not been previously added in the first cell, when the instructions are executed by the terminal, the terminal is further enabled to perform the following steps: entering a connected state; and displaying the 5G network icon if the NR SCG is added; and continuing displaying the 5G network icon after the NR SCG is deleted; or displaying a 4G network icon if the NR SCG is not added.

In another possible design, if the NR SCG has not been added in the first cell within the previous preset duration T, for example, the interval between the time point of registering with the first cell for the second time and the time point of registering with the first cell for the first time is greater than the preset duration T, or the NR SCG has not been previously added in the first cell, when the instructions are executed by the terminal, the terminal is further enabled to perform the following steps: entering an idle state; and displaying the 5G network icon if the first cell supports a non-standalone NSA networking mode; or displaying a 4G network icon if the first cell does not support an NSA networking mode.

In addition, an embodiment of this application provides a terminal. A new radio secondary cell group NR SCG is added to the terminal after the terminal registers with a first cell for the first time, and the first cell is a long term evolution LTE cell. The terminal includes: a screen, configured to display a network icon; one or more processors; a memory; and one or more computer programs, where the one or more computer programs are stored in the memory, the one or more computer programs include instructions, and when the instructions are executed by the terminal, the terminal is enabled to perform the following steps: registering with the first cell for the second time; and displaying a 5G network icon.

In addition, an embodiment of this application provides a terminal, including: a screen, configured to display a network icon; one or more processors; a memory; and one or more computer programs, where the one or more computer programs are stored in the memory, the one or more computer programs include instructions, and when the instructions are executed by the terminal, the terminal is enabled to perform the following steps: registering with a first cell, where the first cell is a long term evolution LTE cell; and displaying a 5G network icon if an NR SCG is added; and continuing displaying the 5G network icon after the NR SCG is deleted; or displaying a 4G network icon if an NR SCG is not added.

In a possible design, the continuing displaying the 5G network icon after the NR SCG is deleted includes: after the NR SCG is deleted, entering a connected state or an idle state, and continuing displaying the 5G network icon.

According to another aspect, an embodiment of this application provides a terminal, including: a screen, configured to display a network icon; one or more processors; a memory; and one or more computer programs, where the one or more computer programs are stored in the memory, the one or more computer programs include instructions, and when the instructions are executed by the terminal, the terminal is enabled to perform the following steps: registering with a first cell, where the first cell is a long term evolution LTE cell; and after initiating a first service and entering a connected state, displaying a 5G network icon if the first cell supports an NSA networking mode; or displaying a 4G network icon if the first cell does not support an NSA networking mode; or after initiating a second service and entering a connected state, displaying a 5G network icon if an NR SCG is added; or displaying a 4G network icon if an NR SCG is not added.

For example, the first service includes an attachment (Attachment) service, a tracking area update TAU service, an SMS message receiving/sending service, or an MSM message receiving/sending service.

In a possible design, when the instructions are executed by the terminal, the terminal is further enabled to perform the following steps: entering an idle state after registering with the first cell; and displaying the 5G network icon if the first cell supports the NSA networking mode; or displaying the 4G network icon if the first cell does not support the NSA networking mode.

According to another aspect, an embodiment of this application provides a terminal, including: a screen, configured to display a network icon; one or more processors; a memory; and one or more computer programs, where the one or more computer programs are stored in the memory, the one or more computer programs include instructions, and when the instructions are executed by the terminal, the terminal is enabled to perform the following steps: registering with a first cell, where the first cell is a long term evolution LTE cell; entering a connected state; and displaying a 5G network icon if detecting an NR signal; or displaying a 4G network icon if skipping detecting an NR signal.

In a possible design, when the instructions are executed by the terminal, the terminal is further enabled to perform the following steps: entering an idle state after registering with the first cell; and displaying the 5G network icon if the first cell supports an NSA networking mode; or displaying the 4G network icon if the first cell does not support an NSA networking mode.

According to another aspect, an embodiment of this application provides an icon display apparatus. The apparatus is included in a terminal. The apparatus has functions of implementing the behavior of the terminal in the method according to any one of the foregoing aspects and the possible designs, so that the terminal performs the network icon display method according to any of the foregoing aspects and the possible designs. The functions may be implemented by hardware, or may be implemented by hardware executing corresponding software. The hardware or the software includes at least one module or unit corresponding to the foregoing functions. For example, the apparatus may include a registration module or unit, a display module or unit, or a processing module or unit.

According to another aspect, an embodiment of this application provides a terminal, including one or more processors and a memory. The memory stores code. When the code is executed by the terminal, the terminal is enabled to perform the network icon display method performed by the terminal according to any one of the foregoing aspects and the possible designs.

According to another aspect, an embodiment of this application provides a computer-readable storage medium, including computer instructions. When the computer instructions are run on a terminal, the terminal is enabled to perform the network icon display method according to any one of the foregoing aspects and the possible designs.

According to another aspect, an embodiment of this application provides a computer program product. When the computer program product runs on a computer, the computer is enabled to perform the network icon display method performed by the terminal according to any one of the foregoing aspects and the possible designs.

According to another aspect, an embodiment of this application provides a chip system. The chip system is applied to a terminal. The chip system includes one or more interface circuits and one or more processors. The interface circuit is interconnected with the processor through a line. The interface circuit is configured to: receive a signal from a memory of a terminal and send the signal to the processor, where the signal includes computer instructions stored in the memory. When the processor executes the computer instructions, the terminal is enabled to perform the network icon display method according to any one of the foregoing aspects and the possible designs.

For beneficial effects corresponding to the other aspects, refer to the descriptions of the beneficial effects of the method. Details are not described herein again.

DESCRIPTION OF EMBODIMENTS

The following describes technical solutions in embodiments of this application with reference to the accompanying drawings in embodiments of this application. In the descriptions of embodiments of this application, "/" means or, unless otherwise specified. For example, A/B may represent A or B. In this specification, "and/or" is merely an association relationship for describing associated objects, and may indicate that three relationships may exist. For example, A and/or B may indicate the following three cases: Only A exists, both A and B exist, and only B exits. In addition, in the descriptions of embodiments of this application, "a plurality of" means two or more.

In the following descriptions, terms "first" and "second" are merely used for description, but it shall not be understood as an indication or implication of relative importance or an implicit indication of a quantity of indicated technical features. Therefore, features limited by "first" and "second" may explicitly or implicitly include one or more features. In the descriptions of embodiments, "a plurality of" means two or more, unless otherwise specified.

Figure 1A:
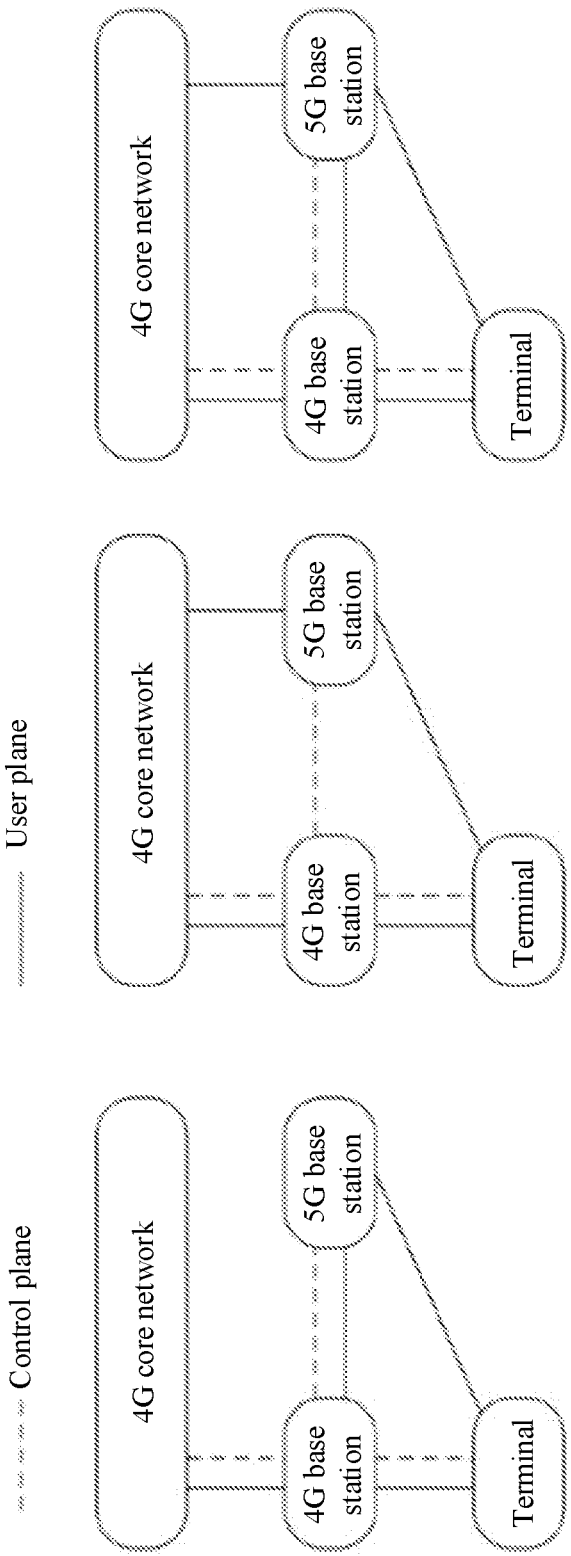
FIG. 1A(a), FIG. 1A(b), and FIG. 1A(c) are a schematic diagram of a group of NSA networking architectures according to an embodiment of this application.

An NSA networking mode can use existing 4G network facilities to deploy a 5G network. There may be a plurality of NSA networking modes. For example, refer to FIG. 1A(a) to FIG. 1A(c). In an NSA networking mode, a 4G base station and a 5G base station (or referred to as a new radio (new radio, NR) base station) share a 4G core network. The 4G base station is a primary base station, and the 5G base station is a secondary base station. Control plane signaling reaches the 4G core network through the 4G base station. User plane signaling may reach the 4G core network through the 4G base station, or may reach the 4G core network through the 5G base station. For example, a 4G network may be a long term evolution (long term evolution, LTE) network, the 4G base station may be an evolved NodeB (evolved NodeB, eNB or eNodeB), the 5G base station may be a next generation NodeB (next generation NodeB, gNB), and the 4G core network may be an evolved packet core (evolved packet core, EPC). The NSA networking mode in FIG. 1A(a) to FIG. 1A(c) may also be referred to as an EN-DC deployment mode.

Figure 1B:
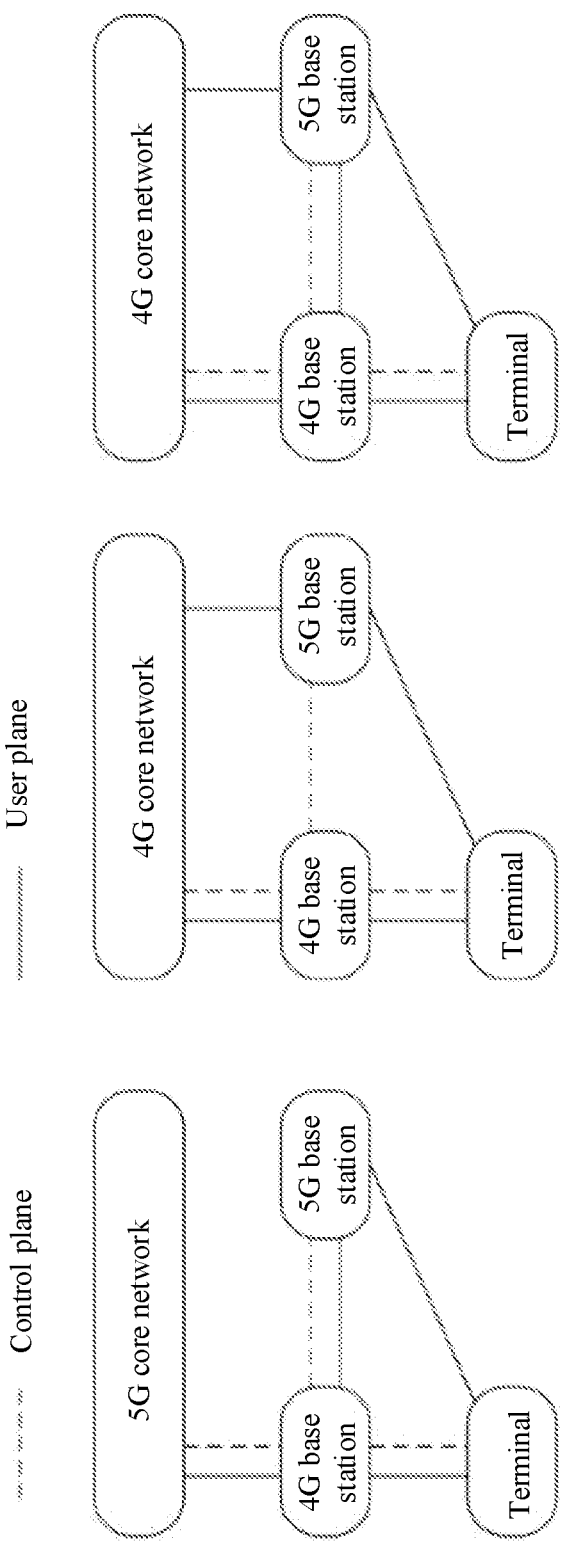
FIG. 1B(a), FIG. 1B(b), and FIG. 1B(c) are a schematic diagram of another group of NSA networking architectures according to an embodiment of this application.

For another example, refer to FIG. 1B(a) to FIG. 1B(c). In another NSA networking mode, a 4G base station and a 5G base station share a 5G core network. The 4G base station is a master base station, and the 5G base station is a secondary base station. Control plane signaling reaches the 5G core network through the 4G base station. User plane signaling may reach the 5G core network through the 4G base station, or may reach the 5G core network through the 5G base station. For example, the 5G core network may be a next generation core (next generation core, NGC).

Because NSA networking involves both 4G and 5G network standards, a terminal in the NSA networking mode involves switching and display of a 4G network icon and a 5G network icon. Currently, there are many types of 5G network icon display solutions of various operators and the 5G network icon display solutions change frequently, and there is no unified display solution. Refer to Table 1. The global system for mobile communications association GSMA has submitted four solutions, that is, CONFIG A/B/C/D, for displaying a 5G network icon by a terminal to the 3rd generation partnership project (3rd generation partnership project, 3GPP).

TABLE 1

| Status | CONFIG A | CONFIG B | CONFIG C | CONFIG D |
|---|---|---|---|---|
| A terminal is in an idle state or a connected state of an LTE cell, and the LTE cell does not support an NSA networking mode | 4G | 4G | 4G | 4G |
| A terminal is in an idle state or a connected state of an LTE cell, the LTE cell supports an NSA networking mode, and signal coverage of an NR base station is not detected | 4G | 4G | 4G | 5G |
| A terminal is in a connected state of an LTE cell, the LTE cell supports an NSA networking mode, and signal coverage of an NR base station is detected | 4G | 4G | 5G | 5G |
| A terminal is in an idle state of an LTE cell, the LTE cell supports an NSA networking mode, and signal coverage of an NR base station is detected | 4G | 5G | 5G | 5G |
| A terminal establishes an LTE + NR dual connectivity in an LTE cell, and the LTE cell supports an NSA networking mode | 5G | 5G | 5G | 5G |
| A terminal is in an idle state or connected to a 5G access network, and accesses a 5G core network | 5G | 5G | 5G | 5G |

In the 5G network icon display solution shown in Table 1, CONFIG B/C requires the terminal to detect in real time whether the terminal has the signal coverage of the NR base station, and therefore power consumption of the terminal is high. Most terminal manufacturers select the CONFIG A/D display solution.

In the CONFIG A solution, a 5G network icon is displayed only when the terminal camps on the LTE cell and establishes the LTE+NR dual connectivity (dual connectivity), and the 5G network icon is not displayed in another case. The LTE+NR dual connectivity refers to an operation that a terminal in a connected state performs communication by using radio resources provided by a master node (master node, MN) and a secondary node (secondary node, SN), and the master node and the secondary node respectively use LTE and NR radio access technologies.

In the LTE+NR dual connectivity state, the terminal corresponds to a master cell group (master cell group, MCG) and a secondary cell group (secondary cell group, SCG). The master cell group includes an LTE cell accessed by the terminal, and the secondary cell group includes an NR cell. Because the LTE+NR dual connectivity may be established and broken frequently between the terminal and a network, the 5G network icon and a 4G network icon displayed by the terminal may be frequently switched, resulting in poor user experience.

In the CONFIG D solution, the 5G network icon is displayed when the terminal camps on the LTE cell and the LTE cell supports the NSA networking mode. In this way, when a user actually uses the terminal to process a service, there may be a scenario in which the terminal displays the 5G network icon but actually has no NR connection, that is, the user actually does not use a 5G network, which is easily misunderstood by the user.

Embodiments of this application provide several network icon display solutions, so that display of a 5G network icon can be more consistent with an actual network status of a terminal, understanding of a user on the 5G network icon can be improved, a quantity of times of switching of a network icon can be reduced, and user experience can be improved.

The network icon display solutions provided in embodiments of this application can optimize the CONFIG A solution or the CONFIG D solution, so that the display of the 5G network icon is more consistent with the actual network status and more consistent with understanding and a cognitive habit of the user.

Figure 2:
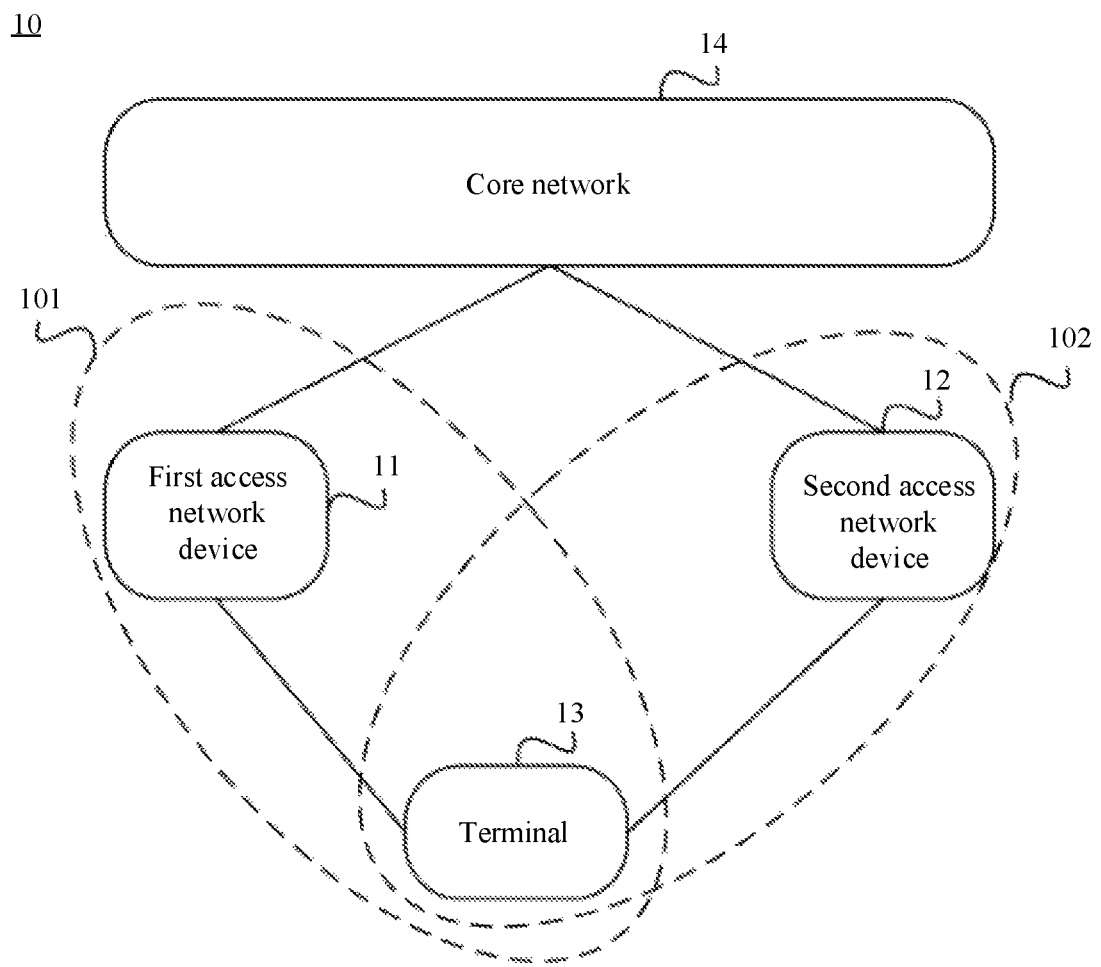
FIG. 2 is a schematic diagram of an architecture of a communications system according to an embodiment of this application.

As shown in FIG. 2, a network icon display solution provided in an embodiment of this application may be applied to a communications system 10.

The communications system 10 is a network system formed by a first mobile communications network 101 and a second mobile communications network 102 through non-standalone networking. The first mobile communications network 101 and the second mobile communications network 102 belong to different network standards. For example, the first mobile communications network may be a 4G network, and the second mobile communications network may be a 5G network. Alternatively, the first mobile communications network may be a 5G network, and the second mobile communications network may be a future 6G communications network. Alternatively, both the first mobile communications network and the second mobile communications network are different future communications networks. Specific types of the first mobile communications network and the second mobile communications network are not limited in this embodiment of this application. When the first mobile communications network is the 4G network and the second mobile communications network is the 5G network, for an architecture of the communications system, reference may be made to FIG. 1A(a) to FIG. 1A(c) or FIG. 1B(a) to FIG. 1B(c).

The communications system 10 includes a first access network device 11 in the first mobile communications network 101, a second access network device 12 in the second mobile communications network 102, a terminal 13, and a core network 14. The core network 14 may include a plurality of network elements or a plurality of network devices. The terminal 13 may establish a communication connection (for example, a radio resource control (radio resource control, RRC) connection) to the first access network device 11 to access the first mobile communications network 101. Alternatively, the terminal 13 may establish a mobile communication connection to each of the first access network device 11 and the second access network device 12, to establish a dual connectivity, so that the terminal 13 accesses the first mobile communications network 101 and the second mobile communications network 102.

The access network device in this embodiment of this application is a device that connects the terminal to a wireless network, and may be an eNB or an eNodeB in an LTE network, a gNB in a 5G network, a base station in a future evolved public land mobile network (public land mobile network, PLMN), a broadband network gateway (broadband network gateway, BNG), an aggregation switch, a non-3rd generation partnership project (3rd generation partnership project, 3GPP) access device, or the like. This is not specifically limited in this embodiment of this application. Optionally, the base stations in this embodiment of this application may include various forms of base stations, for example, a macro station, a micro base station (also referred to as a small station), a relay station, an access point, and the like. This is not specifically limited in this embodiment of this application.

It should be noted that access network devices (for example, the first access network device and the second access network device) in different mobile communications networks may be of different types. For example, when the first mobile communications network is a 4G network, the first access network device may be an eNB. When the second mobile communications network is a 5G network, the second access network device may be a gNB.

The terminal in this embodiment of this application may be a device configured to implement a wireless communication function, for example, may be a terminal device or a chip that can be used in the terminal device. The terminal may be user equipment (user equipment, UE), an access terminal, a terminal unit, a terminal station, a mobile station, a mobile console, a remote station, a remote terminal, a mobile device, a wireless communications device, a terminal agent, a terminal apparatus, or the like in a 4G network, a 5G network, or a future evolved PLMN. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem processor, a vehicle-mounted device or a wearable device, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. The terminal may be mobile or fixed.

Optionally, the access network device and the terminal may also be referred to as a communications apparatus, and may be a general-purpose device or a dedicated device. This is not specifically limited in this embodiment of this application.

In this embodiment of this application, the terminal may display a network icon based on a network status of a currently accessed mobile communications network, so that display of the network icon is more consistent with an actual network status, understanding of a user on the network icon is improved, a quantity of times of switching of the network icon is reduced, and user experience is improved. The network icon may be a network icon of the first mobile communications network or a network icon of the second mobile communications network. The network status may include whether a cell of the first mobile communications network accessed by the terminal supports non-standalone networking, whether the terminal is currently in an idle state or a connected state, whether the terminal establishes a dual connectivity, or whether the terminal detects signal coverage of the second mobile communications network.

Figure 3:
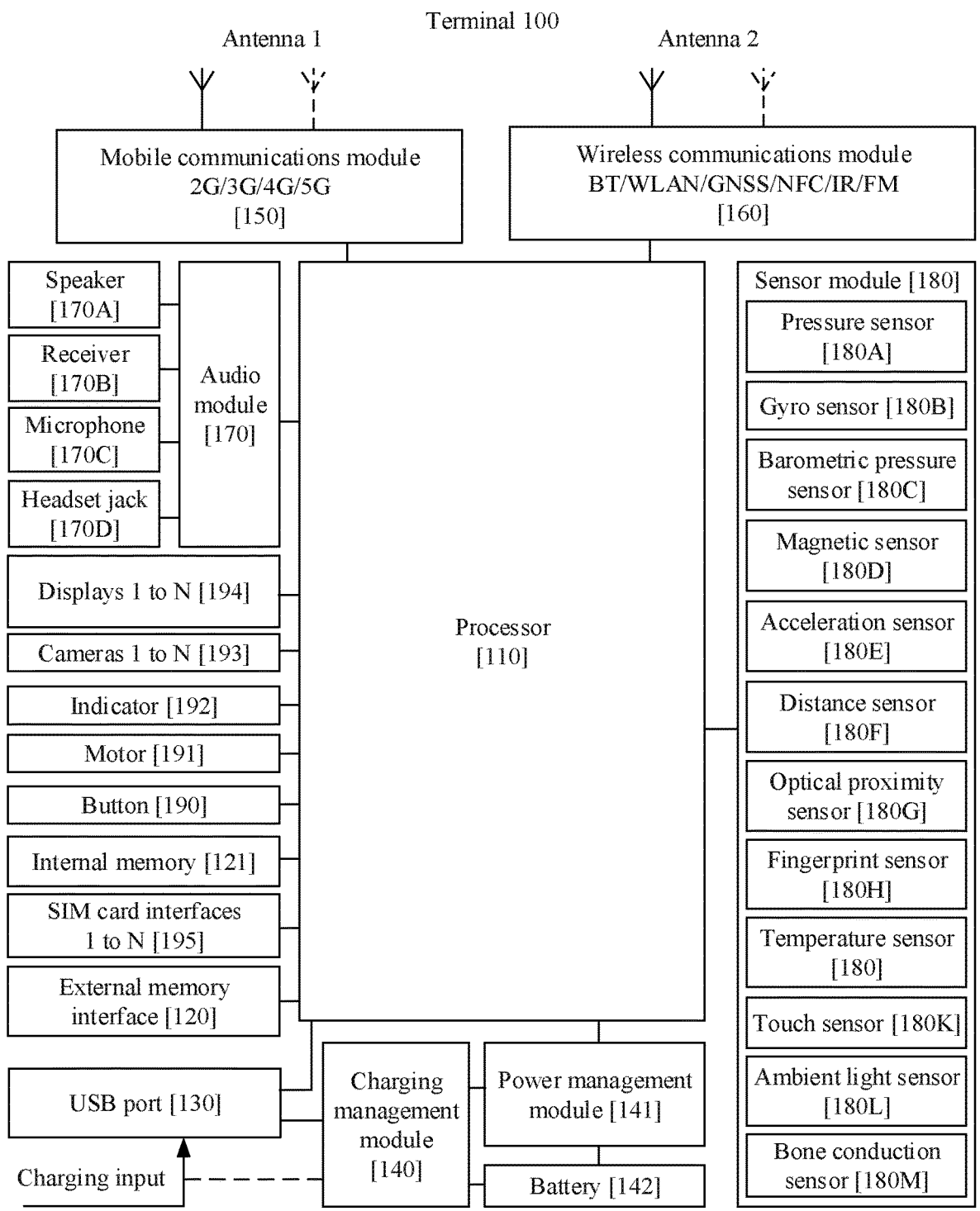
FIG. 3 is a schematic diagram of a hardware structure of a terminal according to an embodiment of this application.

For example, FIG. 3 is a schematic diagram of a structure of a terminal 100. The terminal 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The internal memory 121 may be configured to store computer-executable program code, where the executable program code includes instructions. The processor 110 performs various function applications of the electronic device 100 and data processing by running the instructions stored in the internal memory 121.

The mobile communications module 150 may provide a wireless communication solution that includes 2G/3G/4G/5G or the like and that is applied to the terminal 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to a baseband processor for processing. The low-frequency baseband signal is processed by the baseband processor and then transmitted to an application processor. The application processor outputs a sound signal through the terminal (which is not limited to the speaker 170A, the receiver 170B, or the like), or displays an image or a video through the display 194. In some embodiments, the modem processor may be an independent device. In some other embodiments, the modem processor may be independent of the processor 110, and disposed in a same device as the mobile communications module 150 or another functional module.

For example, in this embodiment of this application, the modem processor may obtain a network status of a mobile communications network of the terminal 100, and report the network status to a controller. For example, the network status may include whether a cell of a first mobile communications network accessed by the terminal supports non-standalone networking, whether the terminal is currently in an idle state or a connected state, whether the terminal establishes a dual connectivity, or whether the terminal detects signal coverage of a second mobile communications network.

The terminal 100 implements a display function through the GPU, the display 194, the application processor, and the like. The GPU is a microprocessor for image processing, and is connected to the display 194 and the application processor. The GPU is configured to perform mathematical and geometric calculation and graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), and the like. In some embodiments, the terminal 100 may include one or N displays 194, where N is a positive integer greater than 1. For example, in this embodiment of this application, the display 194 may display a network icon such as a 5G network icon or a 4G network icon.

The SIM card interface 195 is configured to connect to a SIM card. The SIM card may be inserted into the SIM card interface 195 or removed from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, or the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external storage card. The terminal 100 interacts with a network by using the SIM card to implement functions such as conservation and data communication. In some embodiments, the terminal 100 uses an eSIM, that is, an embedded SIM card. The eSIM card may be embedded in the terminal 100 and cannot be separated from the terminal 100.

It may be understood that the structure shown in this embodiment of this application does not constitute a specific limitation on the terminal 100. In some other embodiments of this application, the terminal 100 may include more or fewer components than those shown in the figure, or combine some components, or split some components, or have different component arrangements. The components shown in the figure may be implemented in hardware, software, or a combination of software and hardware.

In this embodiment of this application, the modem processor may obtain a network status of a mobile communications network of the terminal 100, and report the obtained network status to the controller. The controller determines a target network icon based on the current network status of the terminal 100 by running the instructions stored in the internal memory 121, and notifies the display 194 to display the target network icon. The target network icon is a network icon of a first mobile communications network or a network icon of a second mobile communications network.

A software system of the terminal 100 may use a layered architecture, an event-driven architecture, a microkernel architecture, a micro service architecture, or a cloud architecture. In this embodiment of this application, an Android system of a layered architecture is used as an example to describe a software structure of the terminal 100.

Figure 4:
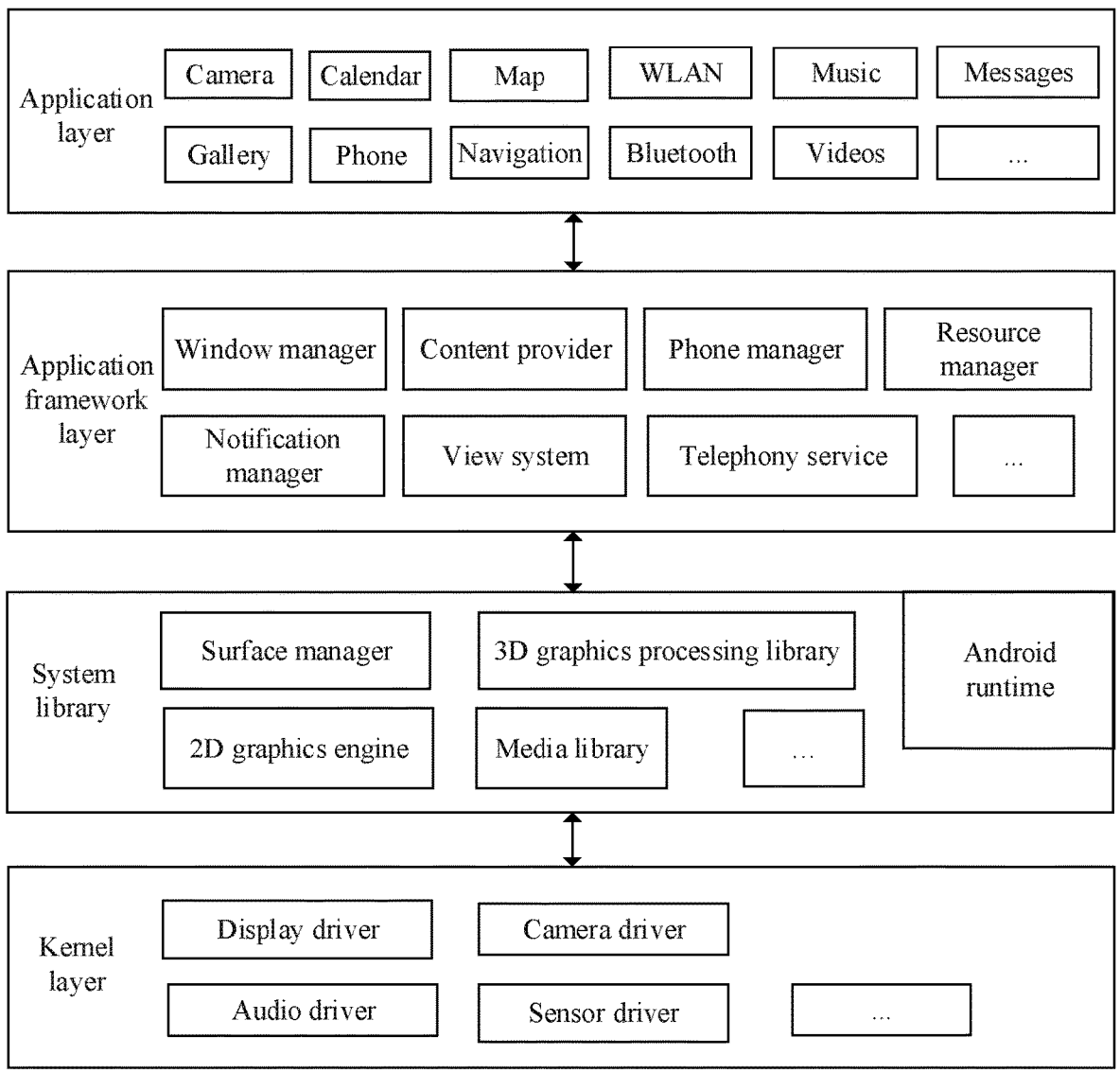
FIG. 4 is a schematic diagram of a software structure of a terminal according to an embodiment of this application.

FIG. 4 is a block diagram of a software structure of a terminal 100 according to an embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 4, the application packages may include applications such as Camera, Gallery, Calendar, Phone, Map, Navigation, WLAN, Bluetooth, Music, Videos, Messages, and the like.

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, or a telephony service.

The Android runtime includes a core library and a virtual machine. The Android runtime is responsible for scheduling and management of the Android system.

The core library includes two parts: a function that needs to be invoked in Java language, and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a 3D graphics processing library (for example, OpenGL ES), and a 2D graphics engine (for example, SGL).

The kernel layer is a layer between hardware and software. The kernel layer includes at least a display driver, a camera driver, an audio driver, and a sensor driver. The hardware may include components such as the modem processor and the display.

The following describes a working procedure of software and hardware of the terminal 100 by using examples with reference to a network icon display scenario.

The modem processor at the hardware layer may obtain a network status of a mobile communications network of the terminal 100, and report the network status to the telephony service at the application framework layer. The telephony service determines, based on the network status of the terminal 100, whether a target network icon is an icon of a first mobile communications network or an icon of a second mobile communications network, and notifies the display 194 at the hardware layer to display the target network icon.

The following separately describes, by using an example in which in the communications system shown in FIG. 2, the first mobile communications network is a 4G network, the second mobile communications network is a 5G network, the first access network device is a 4G base station, the second access network device is a 5G NR base station, and the terminal is a mobile phone having the structure shown in FIG. 3 and FIG. 4, the network icon display solutions provided in embodiments of this application. A network icon displayed in a mobile phone interface may include a 5G network icon or a 4G network icon.

Solution 1:

In a technical solution of Solution 1, after a mobile phone registers with an LTE cell 1, if the terminal has previously established a dual connectivity in the LTE cell 1, it may indicate that the mobile phone in the LTE cell 1 has signal coverage of an NR base station (that is, has coverage of an NR signal, has coverage of an NR cell signal, and the mobile phone may detect an NR signal), has a dual connectivity capability, and has a capability of using a 5G network, so that the mobile phone can directly display a 5G icon. If the terminal has not previously established a dual connectivity in an LTE cell 1, the terminal performs the following procedure: If the mobile phone enters an idle state (also referred to as an inactive state), and the LTE cell 1 supports an NSA networking mode, a mobile phone interface displays a 5G network icon; or if the LTE cell 1 does not support an NSA networking mode, a mobile phone interface displays a 4G network icon. If the mobile phone enters a connected state (also referred to as an active state), and the mobile phone does not establish a dual connectivity, a mobile phone interface displays a 4G network icon; or if the mobile phone establishes a dual connectivity, a mobile phone interface displays a 5G network icon, and the mobile phone continues displaying the 5G network icon after the dual connectivity is subsequently broken.

To be specific, after the terminal registers with the LTE cell 1, if the dual connectivity is established, the terminal stores related information of the LTE cell 1, for example, stores one or more of a cell ID, a cell frequency, a PLMN identifier, or a support capability of an NSA networking mode of the LTE cell 1. Subsequently, after registering with the LTE cell 1 again, the terminal may determine, based on stored historical information, that the dual connectivity is previously established in the cell, to directly display the 5G icon. To be specific, the terminal can directly display the 5G network icon in the LTE cell 1, provided that the terminal has established the dual connectivity in the LTE cell 1. In this technical solution, after a network side adds an NR SCG to the terminal, that is, after the terminal establishes the dual connectivity, if the terminal registers with the first cell again, the terminal in the first cell may still have signal coverage of an NR base station, have a dual connectivity capability, and have a capability of using a 5G network. When the terminal processes a service, the terminal has a condition for using the 5G network for service processing through the dual connectivity, so that a terminal interface can display the 5G network icon. In this solution, the 5G network icon can well match a 5G network capability of the terminal in the first cell, so that the 5G network icon is displayed more accurately.

Figure 5A:
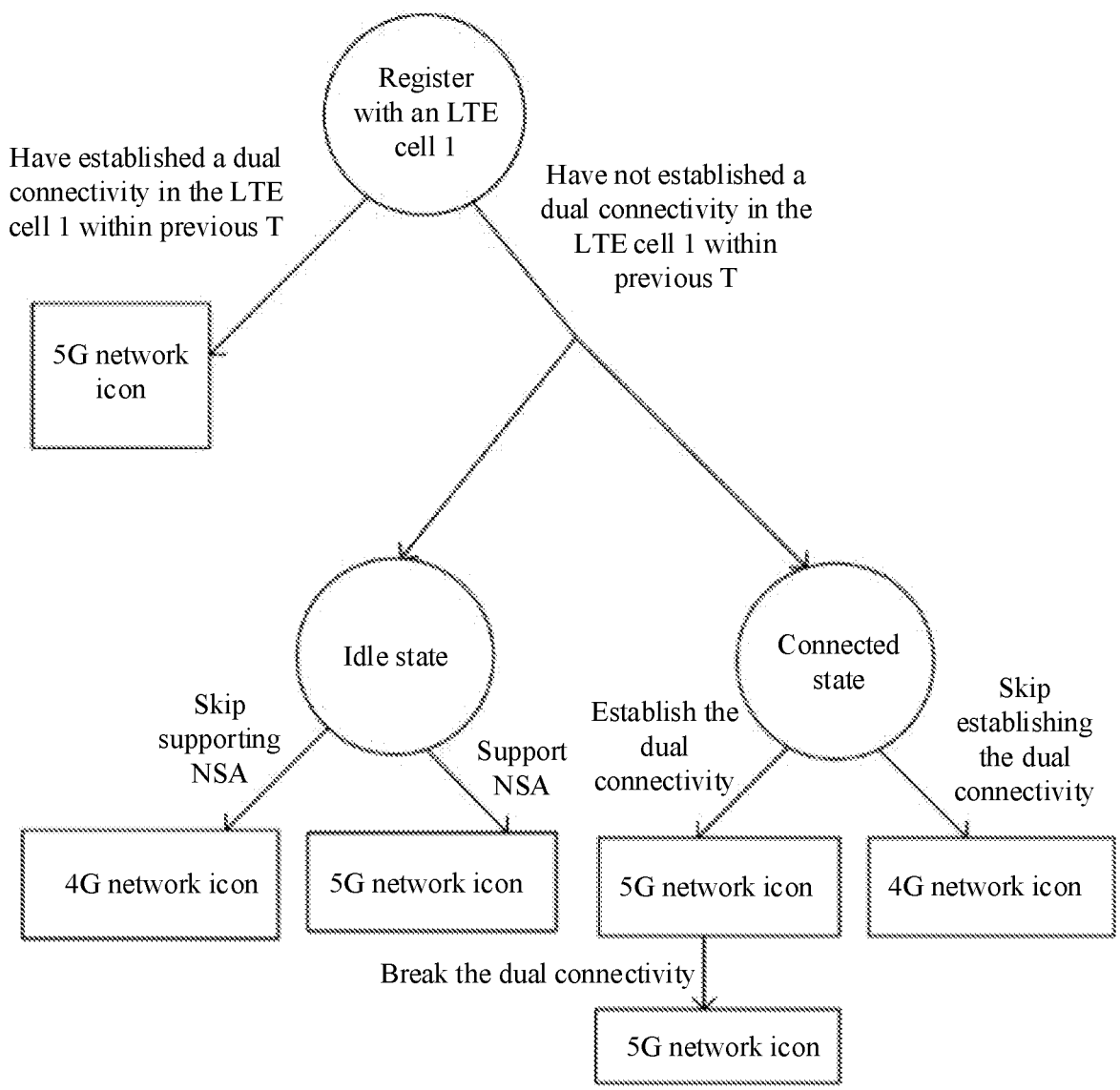
FIG. 5A is a flowchart of a network icon display method according to an embodiment of this application.

Refer to FIG. 5A. In another technical solution of Solution 1, after registering with the LTE cell 1, the mobile phone determines whether a dual connectivity has been established in the LTE cell 1 within previous preset duration T. For example, the preset duration T may be duration such as 3 days, 10 days, or 15 days.

Refer to FIG. 5A. If the mobile phone determines, after registering with the LTE cell 1, that the dual connectivity has been established in the LTE cell 1 within the previous preset duration T, a mobile phone interface displays a 5G network icon.

Refer to FIG. 5A. If the mobile phone determines, after registering with the LTE cell 1, that the dual connectivity has not been established in the LTE cell 1 within the previous preset duration T, the mobile phone performs the following procedure: If the mobile phone enters an idle state and the LTE cell 1 supports an NSA networking mode, a mobile phone interface displays a 5G network icon; or if the LTE cell 1 does not support an NSA networking mode, a mobile phone interface displays a 4G network icon. If the mobile phone enters a connected state and the mobile phone does not establish the dual connectivity, a mobile phone interface displays a 4G network icon; or if the mobile phone establishes the dual connectivity, a mobile phone interface displays a 5G network icon, and the mobile phone continues displaying the 5G network icon after the dual connectivity is subsequently broken.

In addition, after the mobile phone registers with the LTE cell 1, if the mobile phone establishes the dual connectivity, within the preset duration T after the dual connectivity is established, if the mobile phone registers with the LTE cell 1 again after moving out of the LTE cell 1, the mobile phone determines that the dual connectivity has been established in the LTE cell 1 within the previous preset duration T, so that the mobile phone directly displays the 5G network icon. If the mobile phone moves out of the LTE cell 1 after establishing the dual connectivity, and registers with the LTE cell 1 again after the preset duration T after the dual connectivity is established, the mobile phone determines that the dual connectivity has not been established in the LTE cell 1 within the previous preset duration T, so that the mobile phone determines a to-be-displayed network icon based on a network status such as whether the LTE cell 1 supports NSA networking or whether the mobile phone subsequently establishes a dual connectivity.

For example, the preset duration T is 5 days, and the mobile phone establishes a dual connectivity after registering with the LTE cell 1 for the first time. If a time interval between a time point at which the mobile phone registers with the LTE cell 1 for the first time and a time point at which the mobile phone registers with the LTE cell 1 for the second time is less than or equal to 5 days, the mobile phone may directly display the 5G network icon after registering with the LTE cell 1 for the second time. If a time interval between a time point at which the mobile phone registers with the LTE cell 1 for the first time and a time point at which the mobile phone registers with the LTE cell 1 for the second time is greater than 5 days, after registering with the LTE cell 1 for the second time, the mobile phone determines a to-be-displayed network icon based on a network status such as whether the LTE cell 1 supports NSA networking or whether the mobile phone subsequently establishes a dual connectivity.

As described above, the dual connectivity means that the network side (including a core network and an access network) configures a master cell group MCG and a secondary cell group SCG for the terminal in the connected state. For example, after registering with the LTE cell 1, the mobile phone may camp on the LTE cell 1, and the network side may add the LTE cell 1 to the master cell group. The mobile phone may enter a connected state after initiating a service request. For example, a service may be browsing a web page, watching a video, listening to music, or the like. A 4G base station may send NR measurement information to the mobile phone to indicate the mobile phone to detect an NR signal in a neighboring cell (or referred to as a signal in an NR cell). The mobile phone reports an NR signal measurement report to the 4G base station based on the measurement result. The network side (for example, the 4G base station) delivers an RRC reconfiguration based on the NR measurement report, and adds an NR cell with a strong NR signal to a serving cell group; and the mobile phone performs NR random access to establish a secondary cell group (secondary cell group, SCG). To be specific, the network side adds an NR SCG to the mobile phone. The mobile phone accesses the LTE cell and the NR cell, establishes a dual connectivity with the 4G base station and the NR base station, and performs uplink/downlink communication through the 4G base station and the NR base station.

The mobile phone can break the dual connectivity when a service ends or the like, or the network side can break the dual connectivity with the mobile phone when network resources are strained or the like. When breaking the dual connectivity, the network side can delete (that is, release or remove) the NR SCG added to the mobile phone.

Figure 5B:
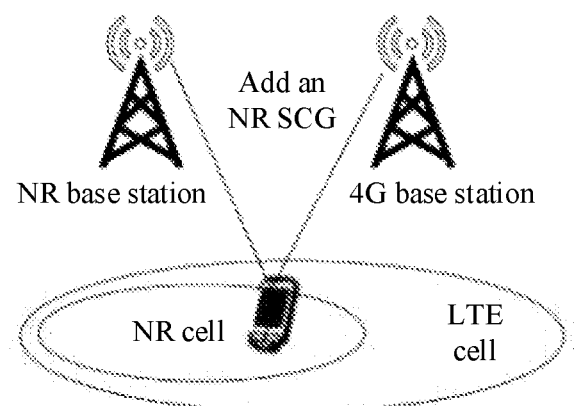
FIG. 5B(a) and FIG. 5B(b) are a schematic diagram of a group of scenarios for establishing and breaking a dual connectivity according to an embodiment of this application.
Figure 5B:
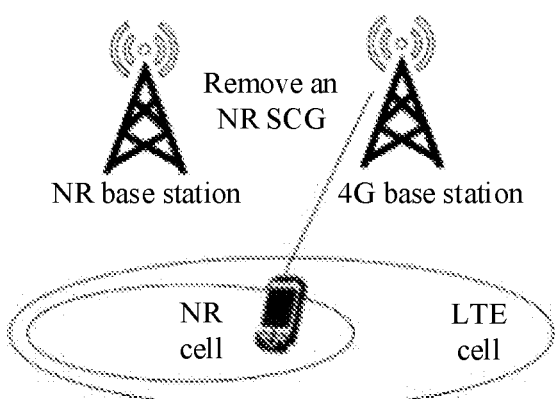

For example, for a schematic diagram of a scenario obtained after the mobile phone establishes the dual connectivity, refer to FIG. 5B(a). For a schematic diagram of a scenario obtained after the mobile phone breaks the dual connectivity, refer to FIG. 5B(b).

To be specific, the mobile phone can establish the dual connectivity after the NR SCG is added. The NR SCG needs to be added to the mobile phone when the mobile phone establishes the dual connectivity. Therefore, in Solution 1 and Solution 2, a determining condition of "establishing the dual connectivity" may be replaced with "adding the NR SCG".

Similarly, the dual connectivity can be broken after the NR SCG of the mobile phone is deleted. The NR SCG previously added to the mobile phone when the dual connectivity is broken is deleted. Therefore, in Solution 1 and Solution 2 described in the following embodiments, a determining condition of "breaking the dual connectivity" may be replaced with "deleting the NR SCG".

In this way, in Solution 1, after the mobile phone registers with the LTE cell 1, if the mobile phone determines that the NR SCG has been added in the LTE cell 1 within the previous preset duration T, a mobile phone interface displays a 5G network icon.

When the mobile phone determines that the NR SCG has not been added in the LTE cell 1 within the previous preset duration T, if the mobile phone enters an idle state and the LTE cell 1 supports an NSA networking mode, a mobile phone interface displays a 5G network icon; or if the mobile phone enters an idle state and the LTE cell 1 does not support an NSA networking mode, a mobile phone interface displays a 4G network icon.

When the mobile phone determines that the NR SCG has not been added in the LTE cell 1 within the previous preset duration T, if the mobile phone enters a connected state and the NR SCG is not added, a mobile phone interface displays a 4G network icon; or if the mobile phone enters a connected state and the NR SCG is added, a mobile phone interface displays a 5G network icon; and the mobile phone continues displaying the 5G network icon after the NR SCG is deleted.

The following mainly describes, from a perspective of whether the mobile phone establishes the dual connectivity, Solution 1 provided in this embodiment of this application.

In some embodiments of this application, after establishing the dual connectivity in the LTE cell 1, the mobile phone may record related information that the dual connectivity has been added in the LTE cell 1, and starts a timer corresponding to the LTE cell 1 to start timing. After the timer corresponding to the LTE cell 1 exceeds the preset duration T, the mobile phone may further delete the previously stored related information that the dual connectivity has been added in the LTE cell 1.

For example, after establishing the dual connectivity in the LTE cell 1, the mobile phone may record an identity (identity, ID) and identification information of the LTE cell 1, where the indication information indicates that the mobile phone has established the dual connectivity in the LTE cell 1. In addition, the mobile phone may further start the timer corresponding to the LTE cell 1 to start timing. After the timer corresponding to the LTE cell 1 exceeds the preset duration T, the mobile phone may delete the ID and the identification information of the LTE cell 1, or the mobile phone may update the identification information corresponding to the LTE cell 1 to that the dual connectivity has not been established. In addition, after establishing the dual connectivity in the LTE cell 1, the mobile phone may further record related information such as frequency information, a PLMN identifier, or a support capability of an NSA networking mode of the LTE cell 1.

For another example, after establishing the dual connectivity in the LTE cell 1, the mobile phone may add the ID of the LTE cell 1 to a whitelist, and start the corresponding timer to start timing. After the timer corresponding to the LTE cell 1 exceeds the preset duration T, the mobile phone removes the identity of the LTE cell 1 from the whitelist. The cell corresponding to the identity that is of the LTE cell and that is in the whitelist is an LTE cell in which the mobile phone has established the dual connectivity within the previous preset duration T.

In the following embodiments, descriptions are provided by using a manner in which a whitelist is used to store an identity of a cell in which a dual connectivity has been established as an example. When the mobile phone registers with the LTE cell 1 again after moving out of the LTE cell 1, if the mobile phone determines that the whitelist includes the identity of the LTE cell 1, the mobile phone has established the dual connectivity in the LTE cell 1 within the previous preset duration T, so that the mobile phone can directly display a 5G network icon.

If the mobile phone has previously established the dual connectivity in the LTE cell 1, it may indicate that the mobile phone in the LTE cell 1 has signal coverage of an NR base station, has a dual connectivity capability, and has a capability of using a 5G network. Because a network environment of the LTE cell 1 is stable in a short period of time and does not easily change greatly, after the mobile phone registers with the LTE cell 1 again within the preset duration T after the dual connectivity is established, the mobile phone in the LTE cell 1 may still have the signal coverage of the NR base station, have the dual connectivity capability, and have the capability of using the 5G network. When the mobile phone processes a service, the mobile phone has a condition for using the 5G network for service processing through the dual connectivity, so that a mobile phone interface can display the 5G network icon.

It may be understood that as a location of a user moves, the mobile phone may have established dual connectivities in a plurality of LTE cells. The mobile phone may record IDs of a plurality of LTE cells in which a dual connectivity has been established. After establishing the dual connectivity again in an LTE cell in which the dual connectivity has been established, the mobile phone may trigger a timer corresponding to the LTE cell to restart timing.

In this way, after accessing one LTE cell each time, the mobile phone may first determine whether a dual connectivity has been established in the LTE cell and whether a corresponding timer expires. If the dual connectivity has been established in the LTE cell and the corresponding timer has not expired, the mobile phone directly displays a 5G network icon. If the dual connectivity has not been established in the LTE cell or the corresponding timer has expired, the mobile phone displays a network icon based on a network status.

For example, for the whitelist stored on the mobile phone, refer to Table 2. As shown in Table 2, cells in which the mobile phone has established the dual connectivity within the previous preset duration T include an LTE cell a, an LTE cell b, an LTE cell c, and the like. In some embodiments, information about the cell in which the dual connectivity has been established that is stored on the mobile phone may further include a frequency, a PLMN identifier, remaining effective duration, a support capability of an NSA networking mode, or the like of the cell. The remaining effective duration is a difference between T and t', and t' is a time interval between a moment at which the mobile phone last established the dual connectivity in the LTE cell and a current moment.

602: The mobile phone determines whether a dual connectivity has been established in the LTE cell 1 within previous preset duration T. Then, the mobile phone performs step 603 or step 604.

After registering with the LTE cell 1, the mobile phone may determine whether the dual connectivity has been established in the LTE cell 1 within the previous preset duration T.

It should be noted that if the mobile phone is powered on for the first time, or the mobile phone has never previously established a dual connectivity, the foregoing whitelist may not be stored on the mobile phone, or the foregoing whitelist may be empty. In this case, the mobile phone may determine that there is no LTE cell in which the dual connectivity has been established within the previous preset duration T.

603: If the mobile phone has established the dual connectivity in the LTE cell 1 within the previous preset duration T, a mobile phone interface displays a 5G network icon.

If the whitelist includes an LTE cell 1, it may indicate that the mobile phone has established the dual connectivity in the LTE cell 1 within the previous preset duration T, and a timer corresponding to the LTE cell 1 does not exceed the preset duration T. To be specific, the mobile phone registers with the LTE cell 1 again within the preset duration T after the dual connectivity is established in the LTE cell 1.

If the mobile phone has previously established the dual connectivity within the LTE cell 1, it may indicate that when the mobile phone camps on the LTE cell 1, near the LTE cell 1, the mobile phone has signal coverage of an NR base station, has a dual connectivity capability, and has a capability of using a 5G network. Because a network environment of the LTE cell 1 is stable in a short period of time and does not easily change greatly, after the mobile phone registers with the LTE cell 1 again within the preset duration T after the dual connectivity is established, the mobile phone in the LTE cell 1 may still have the signal coverage of the NR base station, have the dual connectivity capability, and

TABLE 2

| Cell identity whitelist | Frequency | PLMN Identifier | Remaining effective duration | NSA capability flag |
|---|---|---|---|---|
| LTE cell a | 2110 MHz | 46007 | 10 days 5 hours | 1 (supporting an NSA networking mode) |
| LTE cell b | 3510 MHz | 46003 | 5 days | 1 (supporting an NSA networking mode) |
| LTE cell c | 1930 MHz | 46011 | 3 days 16 hours | 1 (supporting an NSA networking mode) |
| . . . | . . . | . . . | . . . | . . . |

Figure 6:
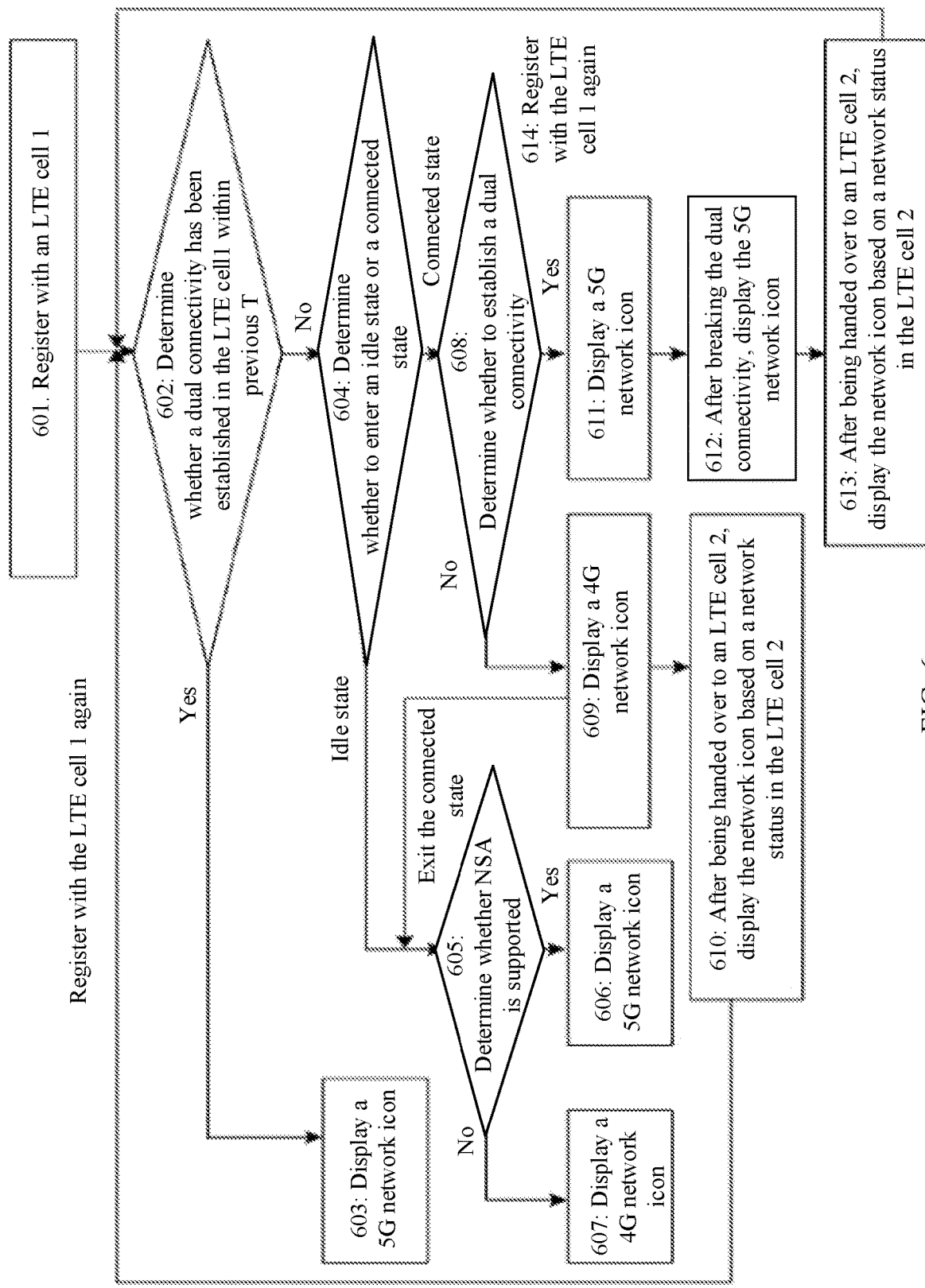
FIG. 6 is a flowchart of another network icon display method according to an embodiment of this application.

For example, FIG. 6 shows a network icon display procedure corresponding to Solution 1. The procedure may include the following steps. 601: A mobile phone registers with an LTE cell 1.

During registration or cell reselection (for example, when the mobile phone is powered on, exits an airplane mode, inserts a card, disconnects from a network, or changes a location) in power-on initialization, the mobile phone may register with the LTE cell 1 through an attachment (Attachment) process. In the attachment process, because the mobile phone has not registered with a network cell, a network icon may not be displayed temporarily, or a default network icon may be displayed.

have the capability of using the 5G network. When the mobile phone processes a service, the mobile phone has a condition for using the 5G network for service processing through the dual connectivity, so that a mobile phone interface can display the 5G network icon.

If the mobile phone has not previously accessed the LTE cell 1 or the mobile phone has not registered with the LTE cell 1 again within the preset duration T after previously establishing the dual connectivity in the LTE cell, the mobile phone may perform the following procedure.

604: The mobile phone determines whether to enter an idle state or a connected state. Then, the mobile phone performs step 605 or step 608.

If the whitelist is empty, or the whitelist does not include the LTE cell 1, it may indicate that the mobile phone has not established the dual connectivity in the LTE cell 1 within the previous preset duration T. In this case, the mobile phone does not directly display the 5G network icon as in step 603, but determines whether the mobile phone is currently in the idle state or the connected state, so that the mobile phone displays the network icon according to different display rules corresponding to the idle state and the connected state.

605: If the mobile phone enters the idle state, the mobile phone determines whether the LTE cell 1 supports an NSA networking mode.

If the mobile phone is in the idle state, the mobile phone displays the 4G network icon or the 5G network icon based on whether the LTE cell 1 supports the NSA networking mode.

606: If the LTE cell 1 supports the NSA networking mode, the mobile phone interface displays the 5G network icon. If the mobile phone determines that the LTE cell 1 supports the NSA networking mode, the mobile phone may display the 5G network icon. For example, the 4G base station may use a preset field in a system information block (system information block, SIB) sent in an attachment process to indicate whether the LTE cell 1 supports REL-15. If the SIB includes the preset field, and the preset field indicates that the LTE cell 1 supports REL-15, the mobile phone determines that the LTE cell 1 supports the NSA networking mode.

If the LTE cell 1 supports the NSA networking mode, the LTE cell 1 may have signal coverage of an NR base station, and the mobile phone may have a dual connectivity condition, and have a capability of using a 5G network, so that the 5G network icon can be displayed.

607: If the LTE cell does not support the NSA networking mode, the mobile phone interface displays the 4G network icon.

If the LTE cell does not support the NSA networking mode, the mobile phone can only use the 4G network but cannot use the 5G network, so that the 4G network icon can be displayed.

After step 606 or step 607, if the mobile phone enters the connected state, the mobile phone may perform step 608.

608: If the mobile phone enters the connected state, the mobile phone determines whether to establish a dual connectivity. Then, the mobile phone performs step 609 or step 611.

For example, a service such as browsing a web page or watching a video may trigger the mobile phone to enter the connected state in the LTE cell 1.

609: If the dual connectivity is not established, the mobile phone interface displays the 4G network icon.

If the mobile phone does not establish the dual connectivity, the mobile phone uses the 4G network and does not use the 5G network when processing a service in the connected state, so that the mobile phone interface can display the 4G network icon.

Subsequently, after the mobile phone exits the connected state and enters the idle state, the mobile phone may perform step 605 again.

610: If the mobile phone moves out of the LTE cell 1 and is handed over to an LTE cell 2, the mobile phone displays the network icon based on a network status in the LTE cell 2.

When the mobile phone moves out of the LTE cell 1 and is handed over to the LTE cell 2, the mobile phone may register with the LTE cell 2 through a tracking area update (tracking area update, TAU) process, to be handed over to the LTE cell 2. In the TAU process, the mobile phone has not been handed over to the LTE cell 2, is still in the LTE cell 1, and may be in the idle state or the connected state. In this case, the mobile phone may display the network icon based on a network status in the LTE cell 1, step 604, and the following procedure.

After registering with the LTE cell 2, similar to a process in which the mobile phone is in the LTE cell 1, after the mobile phone is handed over to the LTE cell 2, the mobile phone may display the network icon based on the network status in the LTE cell 2 in the foregoing procedure shown in steps 602 to 612. Details are not described herein again.

Subsequently, if the mobile phone is handed over back to the LTE cell 1, the mobile phone performs step 602 and the following procedure.

611: If the mobile phone establishes the dual connectivity, the mobile phone interface displays the 5G network icon.

For a process of establishing the dual connectivity by the mobile phone, refer to the foregoing related descriptions. Details are not described herein again. If the network side adds an NR SCG to the mobile phone and the mobile phone establishes the dual connectivity, the mobile phone may access an NR cell, have signal coverage of an NR base station, and use a 5G network, so that the 5G network icon can be displayed.

It should be noted that after the mobile phone establishes the dual connectivity, if the whitelist does not store the LTE cell 1, the LTE cell 1 can be stored in the whitelist, and the timer is started to start timing. When the timer corresponding to the LTE cell 1 exceeds the preset duration T, the mobile phone may delete the LTE cell 1 from the whitelist. For example, the preset duration T is 3 days, and the LTE cell 1 may be deleted from the whitelist after the timer corresponding to the LTE cell 1 starts timing from 0 and the timing reaches 3 days.

After the mobile phone establishes the dual connectivity, if the whitelist has stored the LTE cell 1, the mobile phone may update the timer corresponding to the LTE cell 1, so that the timer corresponding to the LTE cell 1 starts timing again. For example, if the preset duration T is 3 days, the mobile phone may enable the timer corresponding to the LTE cell 1 to start timing again from 0.

612: After breaking the dual connectivity, the mobile phone continues displaying the 5G network icon.

When a service requested by the mobile phone ends or network resources are strained, the network side may delete the NR SCG, to breaking the dual connectivity with the mobile phone. After breaking the dual connectivity, the mobile phone may camp on the LTE cell 1, and may be in the idle state or the connected state in the LTE cell 1.

After breaking the dual connectivity, because the mobile phone has just established the dual connectivity, it may indicate that the mobile phone has signal coverage of an NR base station, has a dual connectivity capability, and has a capability of using a 5G network, so that the mobile phone can continue displaying the 5G network icon.

613: After the mobile phone moves out of the LTE cell 1 and is handed over to the LTE cell 2, the mobile phone displays the network icon based on the network status in the LTE cell 2.

Similar to a process in which the mobile phone is in the LTE cell 1, after the mobile phone is handed over to the LTE cell 2, the mobile phone may display the network icon based on the network status in the LTE cell 2 in the foregoing procedure shown in steps 602 to 612. Details are not described herein again.

614: The mobile phone registers with the LTE cell 1 again, and performs step 602. To be specific, after the mobile phone registers with the LTE cell 1 again, if the whitelist includes the LTE cell 1, it may indicate that the mobile phone registers with the LTE cell 1 again within the preset duration T after the dual connectivity is established in the LTE cell 1. Because a network environment of the LTE cell 1 is stable within the preset duration T and does not easily change greatly, the mobile phone in the LTE cell 1 may still have the signal coverage of the NR base station, have the dual connectivity capability, and have the capability of using the 5G network. When the mobile phone processes a service, the mobile phone has a condition for using the 5G network for service processing through the dual connectivity, so that the mobile phone can continue displaying the 5G network icon.

After the mobile phone registers with the LTE cell 1 again, if the whitelist does not include the LTE cell 1, it may indicate that duration between a time point at which the mobile phone registers with the LTE cell 1 again and a time point at which the mobile phone establishes the dual connectivity in the LTE cell 1 is greater than the preset duration T. If the duration between the time point at which the mobile phone registers with the LTE cell 1 again and the time point at which the mobile phone establishes the dual connectivity in the LTE cell 1 is greater than the preset duration T, it may indicate that a network environment of the LTE cell 1 may have changed when the mobile phone moves out of the LTE cell 1 for a long period of time. In this case, the mobile phone in the LTE cell 1 may no longer have the signal coverage of the NR base station, no longer have the dual connectivity capability, and no longer have the capability of using the 5G network. Therefore, the mobile phone does not directly display the 5G network icon, but redetermines a to-be-displayed network icon based on a network status such as whether the LTE cell 1 supports the NSA networking mode.

There may be a plurality of reasons why the network environment changes. For example, an operator may cancel an NR cell or an NR base station configured at a location of the current LTE cell 1. Therefore, the LTE cell 1 no longer has the signal coverage of the NR base station. For example, at an initial stage of network construction, a layout of the NR base station may not be mature enough, the operator may change or adjust the layout of the NR base station, and the operator may cancel the NR SCG configured for the current LTE cell 1. Therefore, the LTE cell 1 no longer has the signal coverage of the NR base station. Alternatively, the NR base station previously connected to the mobile phone may have failed. Therefore, the LTE cell 1 no longer has the signal coverage of the NR base station.

In this solution, when the mobile phone interface displays the 5G network icon, the mobile phone is in the idle state and the LTE cell 1 supports the NSA networking mode. Alternatively, when the mobile phone interface displays the 5G network icon, the mobile phone registers with the LTE cell 1 again within the preset duration T after the dual connectivity is established in the LTE cell 1. In this case, the mobile phone may have signal coverage of an NR base station, establish a dual connectivity, have a capability of using a 5G network, and process a service through the 5G network. Unlike the CONFIG D solution in which there may be a scenario in which there is no NR connection when a user actually uses the mobile phone to process a service, that is, the user actually does not use the 5G network, in Solution 1, user experience is good. Therefore, in Solution 1, the 5G network icon can well match a 5G network capability of the mobile phone in the LTE cell 1, so that the 5G network icon is displayed more accurately, the display of the 5G network icon is more consistent with an actual network status of the terminal, and understanding of the user on the 5G network icon can be improved. Solution 1 may be used as an optimization solution of CONFIG D, and may be referred to as a D++ solution.

In some cases, the user may frequently move in a plurality of LTE cells. The plurality of LTE cells in which the user often moves are usually fixed and the plurality of LTE cells are usually stored in the whitelist. When the mobile phone is frequently handed over between these different LTE cells, because these LTE cells exist in the whitelist, the mobile phone can display the 5G network icon in each of the different LTE cells, and frequent switching of the network icon that is caused by the cell handover does not occur.

Another embodiment of this application further provides another network icon display solution. This solution is similar to Solution 1, and a difference lies in that after camping on the LTE cell 1, the mobile phone determines whether the dual connectivity has been broken in the LTE cell 1 within the previous preset duration T.

Figure 5C:
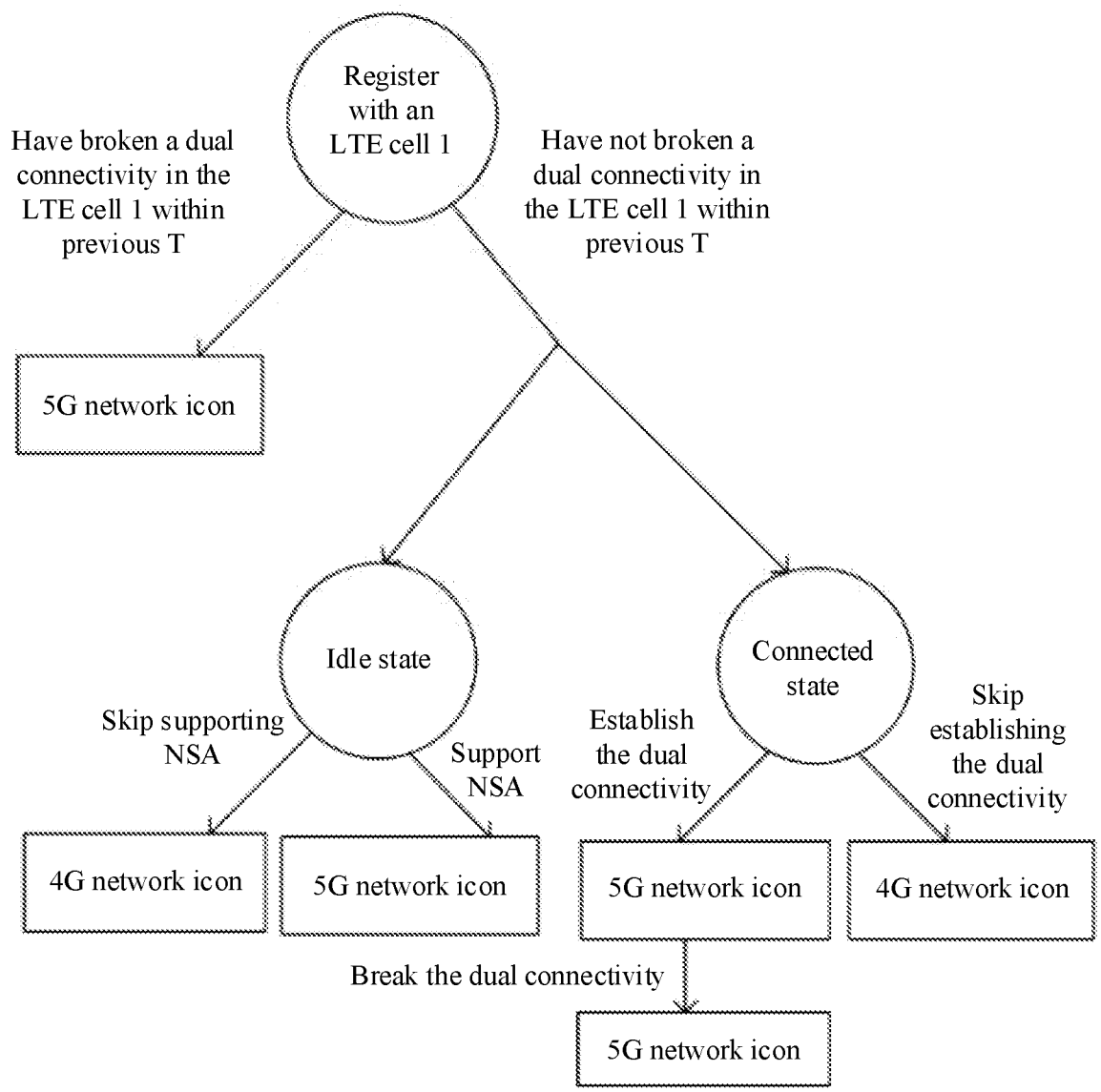
FIG. 5C is a flowchart of another network icon display method according to an embodiment of this application.

Refer to FIG. 5C. This solution may include: After registering with the LTE cell 1, the mobile phone determines whether the dual connectivity has been broken in the LTE cell 1 within the previous preset duration T. For example, the preset duration T may be duration such as 3 days, 10 days, or 15 days. If the mobile phone determines, after registering with the LTE cell 1, that the dual connectivity has been broken in the LTE cell 1 within the previous preset duration T, a mobile phone interface displays a 5G network icon. If the mobile phone determines, after registering with the LTE cell 1, that the dual connectivity has not been broken in the LTE cell 1 within the previous preset duration T, the mobile phone performs the following procedure: If the mobile phone enters an idle state (also referred to as an inactive state) and the LTE cell 1 supports an NSA networking mode, a mobile phone interface displays a 5G network icon; or if the LTE cell 1 does not support an NSA networking mode, a mobile phone interface displays a 4G network icon. If the mobile phone enters a connected state (also referred to as an active state), and the mobile phone does not establish a dual connectivity, a mobile phone interface displays a 4G network icon; or if the mobile phone establishes a dual connectivity, a mobile phone interface displays a 5G network icon, and the mobile phone continues displaying the 5G network icon after the dual connectivity is subsequently broken.

In addition, after the mobile phone registers with the LTE cell 1, if the mobile phone breaks the dual connectivity, within the preset duration T after the dual connectivity is broken, if the mobile phone registers with the LTE cell 1 again after moving out of the LTE cell 1, the mobile phone determines that the dual connectivity has been broken in the LTE cell 1 within the previous preset duration T, so that the mobile phone still displays the 5G network icon. If the mobile phone moves out of the LTE cell 1 after breaking the dual connectivity, and registers with the LTE cell 1 again after the preset duration T after the dual connectivity is broken, the mobile phone determines that the dual connectivity has not been broken in the LTE cell 1 within the previous preset duration T, so that the mobile phone displays, in the idle state, the network icon based on whether the LTE cell 1 supports the NSA networking mode, and displays, in the connected state, the network icon based on whether the dual connectivity is established.

In this way, when the mobile phone registers with the LTE cell 1 again after moving out of the LTE cell 1, if the mobile phone determines that the whitelist includes the LTE cell 1, the mobile phone may determine that a timer corresponding to the LTE cell 1 has not exceeded the preset duration T, so that the 5G network icon can be directly displayed. If the mobile phone has previously broken the dual connectivity in the LTE cell 1, it may indicate that the mobile phone in the LTE cell 1 has signal coverage of an NR base station (that is, has coverage of an NR signal, has coverage of an NR cell signal, and may detect an NR signal), has a dual connectivity capability, and has a capability of using a 5G network. Because a network environment of the LTE cell 1 is stable in a short period of time and does not easily change greatly, after the mobile phone registers with the LTE cell 1 again within the preset duration T after the dual connectivity is broken, the mobile phone in the LTE cell 1 may still have the signal coverage of the NR base station, have the dual connectivity capability, and have the capability of using the 5G network. When the mobile phone processes a service, the mobile phone has a condition for using the 5G network for service processing through the dual connectivity, so that a mobile phone interface can display the 5G network icon.

Solution 2:

In Solution 2, the mobile phone may display a 4G network icon after registering with an LTE cell 1. Subsequently, a mobile phone interface displays a 5G network icon if an NR SCG is added to the mobile phone; and the mobile phone interface continues displaying the 5G network icon after the NR SCG of the mobile phone is deleted.

To be specific, after the mobile phone registers with the LTE cell 1, if the NR SCG is added to the mobile phone, the mobile phone interface displays the 5G network icon; and the mobile phone continues displaying the 5G network icon after the NR SCG of the mobile phone is deleted. After the mobile phone registers with the LTE cell 1, if the NR SCG is not added to the mobile phone, the mobile phone interface displays the 4G network icon.

From a perspective of whether the mobile phone establishes the dual connectivity, Solution 2 may include: After the mobile phone registers with the LTE cell 1, if the mobile phone establishes the dual connectivity, the mobile phone continuously displays the 5G network icon when the mobile phone does not move out of the LTE cell 1; or if the mobile phone does not establish the dual connectivity, the mobile phone interface displays the 4G network icon.

Figure 7:
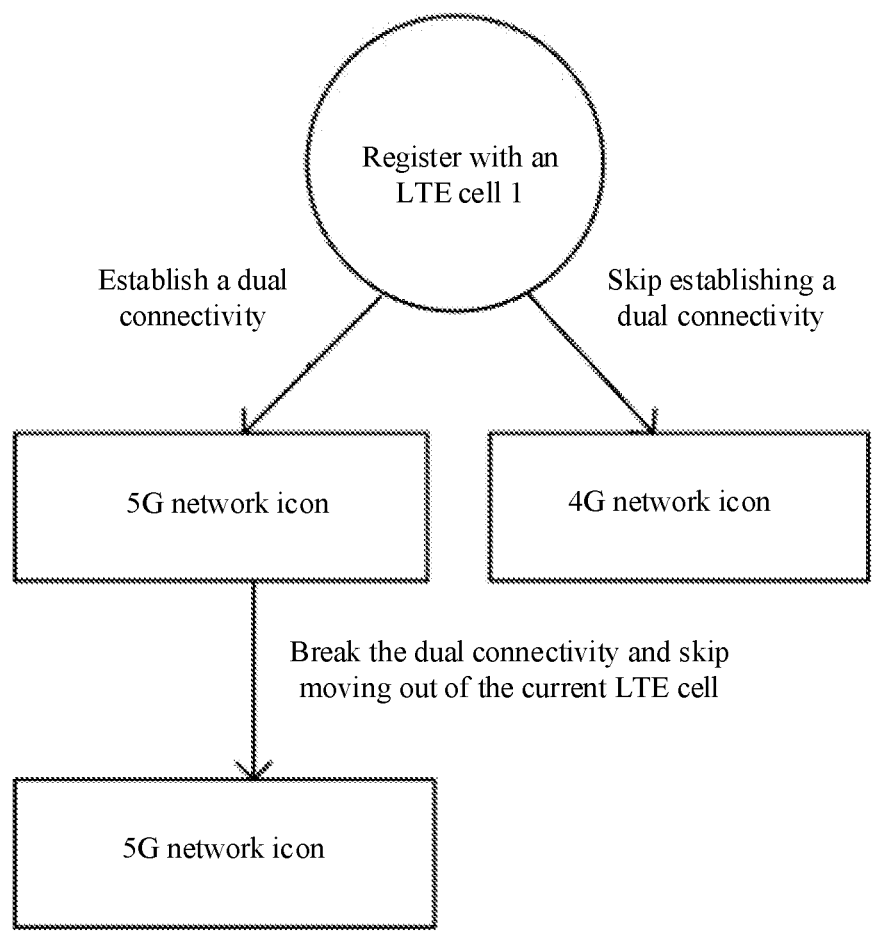
FIG. 7 is a flowchart of another network icon display method according to an embodiment of this application.

Specifically, refer to FIG. 7. The mobile phone may enter an idle state or a connected state after registering with the LTE cell 1. If the mobile phone enters the idle state, the mobile phone interface displays the 4G icon. If the mobile phone does not establish the dual connectivity after entering the connected state, the mobile phone interface displays the 4G network icon; or if the mobile phone establishes the dual connectivity after entering the connected state, the mobile phone may continuously display the 5G network icon when the mobile phone continuously camps on the LTE cell 1 and does not move out.

When the mobile phone camps on the LTE cell 1, if the mobile phone does not establish the dual connectivity, the mobile phone in the LTE cell 1 may not have signal coverage of an NR base station, a dual connectivity capability, and a capability of using a 5G network. If the mobile phone has established the dual connectivity, it may indicate that the mobile phone in the LTE cell 1 has signal coverage of an NR base station, a dual connectivity capability, and a capability of using a 5G network, so that when the mobile phone does not move out of the LTE cell 1, the mobile phone can continuously display the 5G network icon regardless of whether the dual connectivity is broken.

When the mobile phone moves out of the LTE cell 1 and enters an LTE cell 2, the mobile phone may determine, based on the processing procedure of Solution 2 and a network status in the LTE cell 2, whether to display the 4G network icon or the 5G network icon.

After the mobile phone registers with the LTE cell 1 again, because a network environment of the LTE cell 1 may have changed within a time period for which the mobile phone moves out of the LTE cell 1, the LTE cell 1 may no longer have the signal coverage of the NR base station, the dual connectivity capability, and the capability of using the 5G network. Therefore, the mobile phone may no longer display the 5G network icon after registering with the LTE cell 1 again, but determine, again based on the processing procedure of Solution 2 and a network status of the mobile phone in the LTE cell 1, whether to display the 4G network icon or the 5G network icon.

In this way, when the mobile phone interface displays the 5G network icon, it may indicate that the mobile phone has established the dual connectivity in the current LTE cell and has not moved out of the current LTE cell after establishing the dual connectivity. In this case, the mobile phone has the signal coverage of the NR base station, has a possibility of establishing the dual connectivity, and has the capability of using the 5G network. Therefore, unlike the CONFIG A solution in which the 5G network icon and the 4G network icon are frequently switched based on whether the dual connectivity is established and broken, in Solution 2, user experience is good. Solution 2 may be used as an optimization solution of CONFIG A, and may be referred to as an A+ solution.

Figure 8:
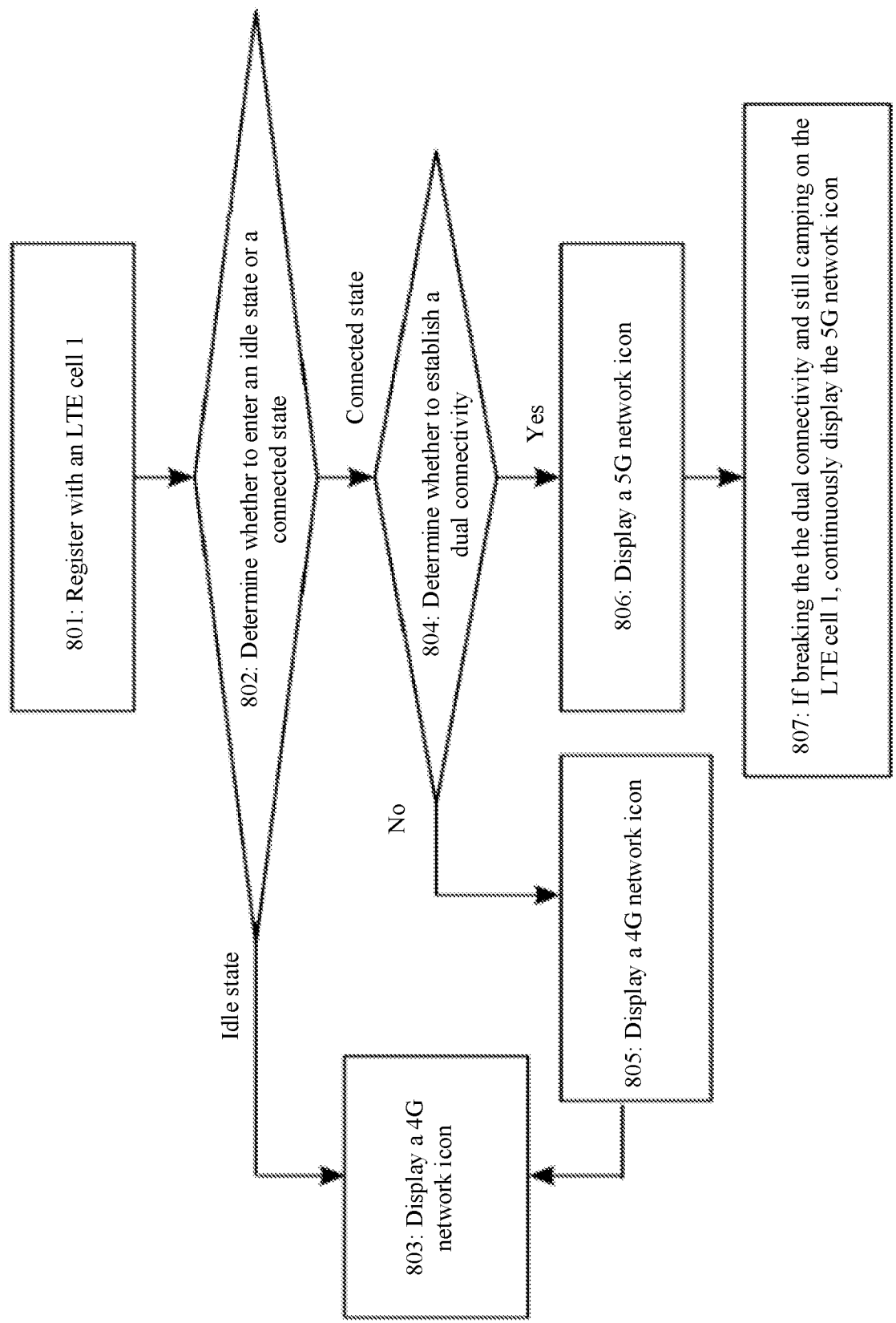
FIG. 8 is a flowchart of another network icon display method according to an embodiment of this application.

For example, FIG. 8 shows a network icon display procedure corresponding to Solution 2. The procedure may include the following steps.

801: A mobile phone registers with an LTE cell 1.

The mobile phone can register with the LTE cell 1 after being powered on, exiting an airplane mode, inserting a card, or disconnecting from a network. Alternatively, the mobile phone may be handed over from another LTE cell to the LTE cell 1 after changing a location, to register with the LTE cell 1.

802: The mobile phone determines whether to enter an idle state or a connected state. Then, the mobile phone performs step 803 or step 804.

803: If the mobile phone enters the idle state, a mobile phone interface displays a 4G network icon.

Subsequently, if the mobile phone enters the connected state, the mobile phone performs step 804.

804: If the mobile phone enters the connected state, the mobile phone determines whether to establish a dual connectivity. Then, the mobile phone performs step 805 or step 806.

805: If the mobile phone does not establish the dual connectivity, the mobile phone interface displays the 4G network icon.

If the mobile phone does not establish the dual connectivity, the mobile phone uses the 4G network and does not use the 5G network when processing a service in the connected state, so that the mobile phone interface can display the 4G network icon.

Subsequently, after the mobile phone exits the connected state and enters the idle state, the mobile phone performs step 803 to display the 4G network icon.

806: If the mobile phone establishes the dual connectivity, the mobile phone interface displays a 5G network icon.

If a network side adds an NR SCG to the mobile phone and the mobile phone establishes the dual connectivity, the mobile phone accesses an NR cell, has signal coverage of an NR base station, and may use a 5G network, so that the 5G network icon can be displayed.

807: If the mobile phone breaks the dual connectivity and still camps on the LTE cell 1, the mobile phone continuously displays the 5G network icon:

If the mobile phone has established the dual connectivity, it may indicate that the mobile phone has signal coverage of an NR base station, a dual connectivity capability, and a capability of using a 5G network, so that when the mobile phone does not move out of the LTE cell 1, the mobile phone can continuously display the 5G network icon regardless of whether the dual connectivity is broken or whether the mobile phone is in the idle state or the connected state.

After the mobile phone moves out of the LTE cell 1 and is handed over to an LTE cell 2, the mobile phone may display the network icon based on a network status in the LTE cell 2. Similar to a process in which the mobile phone is in the LTE cell 1, the mobile phone may display the network icon based on the network status in the LTE cell 2 and a processing procedure of Solution 2. Details are not described herein again. After registering with the LTE cell 1 again, the mobile phone performs steps 801 to 807 again.

After the mobile phone registers with the LTE cell 1 again, because a network environment may have changed, the mobile phone in the LTE cell 1 may no longer have the signal coverage of the NR base station, the dual connectivity capability, and the capability of using the 5G network. Therefore, the mobile phone can perform step 802 and the following procedure again without continuously displaying the 5G network icon.

After the mobile phone moves out of the LTE cell 1, because a network environment of the LTE cell 1 may have changed, the mobile phone in the LTE cell 1 may no longer have the signal coverage of the NR base station, the dual connectivity capability, and the capability of using the 5G network. Therefore, after registering with the LTE cell 1 again, the mobile phone no longer continuously displays the 5G network icon, but redetermines a to-be-displayed network icon based on a current network status.

In this way, when the mobile phone interface displays the 5G network icon, it may indicate that the mobile phone has established the dual connectivity in the current LTE cell and has not moved out of the current LTE cell after establishing the dual connectivity. In this case, the mobile phone has the signal coverage of the NR base station, has a possibility of establishing the dual connectivity, and has the capability of using the 5G network. Therefore, unlike the CONFIG A solution in which the 5G network icon and the 4G network icon are frequently switched based on whether the dual connectivity is established and broken, in Solution 2, user experience is good.

In some cases, as a location of a user moves, the mobile phone may be frequently handed over between different LTE cells. For example, the user often camps on the LTE cell 1, and is also often handed over to an LTE cell 2 temporarily (for example, the mobile phone passes through a location at which the LTE cell 2 is located). The mobile phone may not establish a dual connectivity after being handed over to the LTE cell 2 temporarily, so that the mobile phone displays the 4G network icon. If the mobile phone has established the dual connectivity in the LTE cell 1 and continues displaying the 5G network icon after being handed over to the LTE cell 2 and registering with the LTE cell 1 again, when the mobile phone is handed over back and forth between the LTE cell 1 and the LTE cell 2, the mobile phone performs frequent switching between the 5G network icon and the 4G network icon. Consequently, user experience is poor. In Solution 2, the mobile phone no longer displays the 5G network icon after moving out of the LTE cell 1 and registering with the LTE cell 1 again. Therefore, frequent switching of a network icon that is caused by the cell handover is not likely to occur.

Solution 3:

Solution 3 includes: A mobile phone registers with an LTE cell 1. After the mobile phone initiates a first service and the mobile phone enters a connected state, if the LTE cell 1 supports an NSA networking mode, a mobile phone interface displays a 5G network icon; or if the LTE cell 1 does not support an NSA networking mode, a mobile phone interface displays a 4G network icon. After the mobile phone initiates a second service and the mobile phone enters a connected state, if an NR SCG is added to the mobile phone, a mobile phone interface displays a 5G network icon; or if an NR SCG is not added to the mobile phone, a mobile phone interface displays a 4G network icon. After the mobile phone enters an idle state, if the LTE cell 1 supports an NSA networking mode, a mobile phone interface displays a 5G network icon; or if the LTE cell 1 does not support a non-standalone NSA networking mode, a mobile phone interface displays a 4G network icon.

Figure 9:
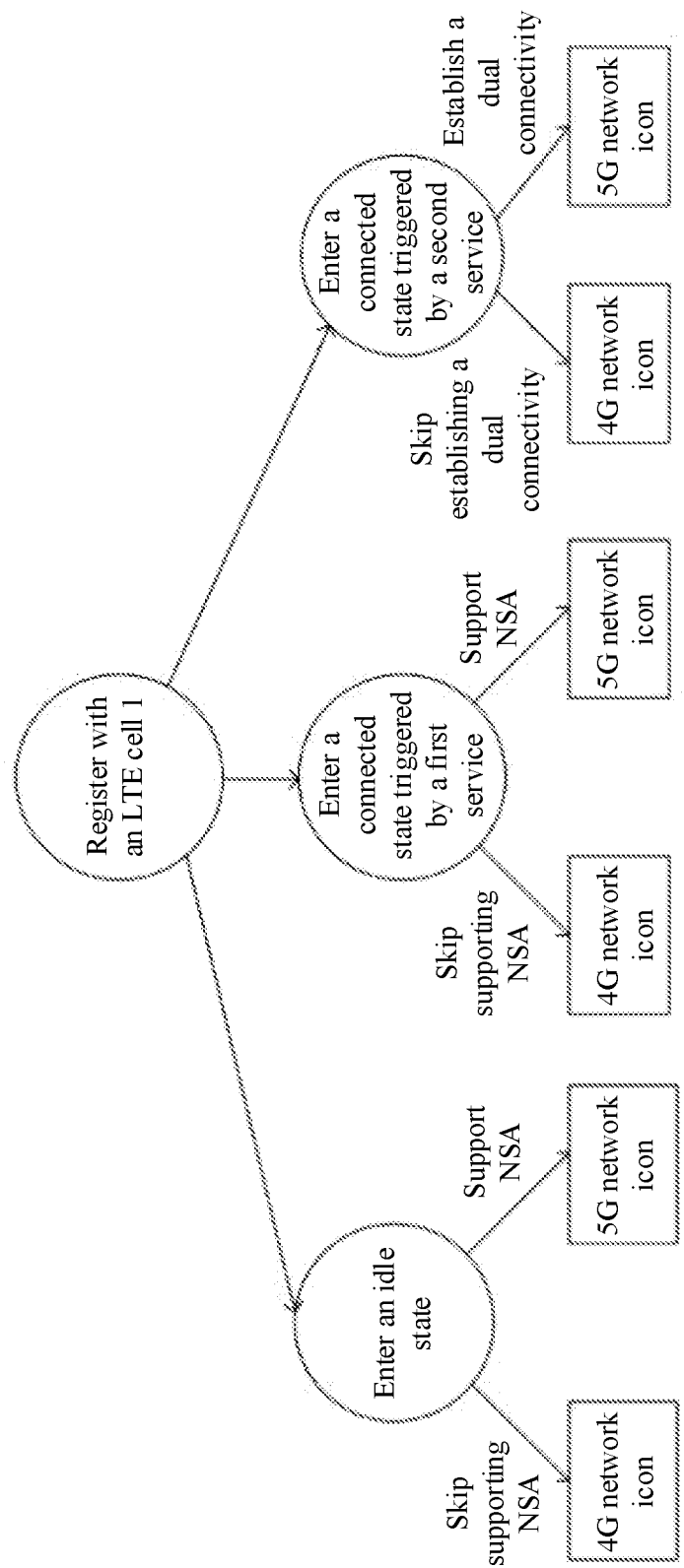
FIG. 9 is a flowchart of another network icon display method according to an embodiment of this application.

Refer to FIG. 9. From a perspective of whether the mobile phone establishes the dual connectivity, Solution 2 may include: The mobile phone registers with the LTE cell 1. After the mobile phone initiates the first service and the mobile phone enters the connected state, if the LTE cell 1 supports NSA, the mobile phone interface displays the 5G network icon; or if the LTE cell 1 does not support the NSA networking mode, the mobile phone interface displays the 4G network icon. After the mobile phone initiates the second service and the mobile phone enters the connected state, if the mobile phone establishes the dual connectivity, the mobile phone interface displays the 5G network icon; or if the mobile phone does not establish the dual connectivity, the mobile phone interface displays the 4G network icon. After the mobile phone enters the idle state, if the LTE cell 1 supports the NSA networking mode, the mobile phone interface displays the 5G network icon; or if the LTE cell 1 does not support the NSA networking mode, the mobile phone interface displays the 4G network icon.

The first service may usually trigger the mobile phone to enter a connected state for a short period of time, for example, an attachment service, a TAU service, an SMS message receiving/sending service, or an MSM message receiving/sending service. The second service may usually trigger the mobile phone to enter a connected state for a long period of time, and is a service with a long period of time, for example, may include a data service, for example, an internet access service such as browsing a web page, watching a video, or listening to music, or a VoLTE call service.

In Solution 3, for the second service, after entering the connected state, if the mobile phone establishes the dual connectivity, the mobile phone may process the second service by using a high-performance communication capability of the 5G network, and the mobile phone interface displays the 5G network icon; or if the mobile phone does not establish the dual connectivity, the mobile phone processes the second service through the 4G network, and the mobile phone interface displays the 4G network icon.

In the current NSA networking mode, because a probability that the LTE cell supports the NSA networking mode is high, a probability that the mobile phone displays the 5G network icon in the idle state is also high. For the first service, if the 5G network icon is also displayed after the dual connectivity is established in the connected state, and the 4G network icon is displayed when the dual connectivity is not established, after the first service triggers the mobile phone to enter the connected state, the mobile phone displays the 4G network icon because the dual connectivity is not established, and the mobile phone enters the idle state again after the first service quickly ends. If the mobile phone determines that the LTE cell 1 supports the NSA networking mode, the mobile phone displays the 5G network icon again, to frequently switch between the 5G network icon and the 4G network icon.

In Solution 3, similar to the idle state, for the connected state initiated through the first service, the mobile phone also displays the network icon based on whether the NSA networking mode is supported. Therefore, frequent switching between the 4G network icon and the 5G network icon is not likely to occur. For example, after the first service triggers the mobile phone to enter the connected state, if the mobile phone determines that the LTE cell 1 supports the NSA networking mode, the mobile phone displays the 5G network icon. After the first service quickly ends, the mobile phone enters the idle state. If the mobile phone determines that the LTE cell 1 supports the NSA networking mode, the mobile phone continues displaying the 5G network icon. Therefore, in Solution 3, the mobile phone does not frequently switch between the 5G network icon and the 4G network icon due to the first service, so that user experience is good.

In addition, in Solution 3, after the mobile phone initiates the connected state through the second service, if the mobile phone establishes the dual connectivity, the mobile phone interface displays the 5G network icon; and if the mobile phone interface displays the 5G network icon, it may indicate that when processing the second service, the mobile phone establishes the dual connectivity and uses a 5G network. Unlike the CONFIG D solution in which there may be a scenario in which there is no NR connection when a user actually uses the mobile phone to process a service, that is, the user actually does not use the 5G network, in Solution 3, user experience is good. Therefore, the 5G network icon can well match a 5G network capability of the mobile phone in the LTE cell 1, so that the 5G network icon is displayed more accurately, the display of the 5G network icon is more consistent with an actual network status of the terminal, and understanding of the user on the 5G network icon can be improved. Solution 3 may be used as an optimization solution of CONFIG D and CONFIG A, and may be referred to as a D+A solution.

Figure 10:
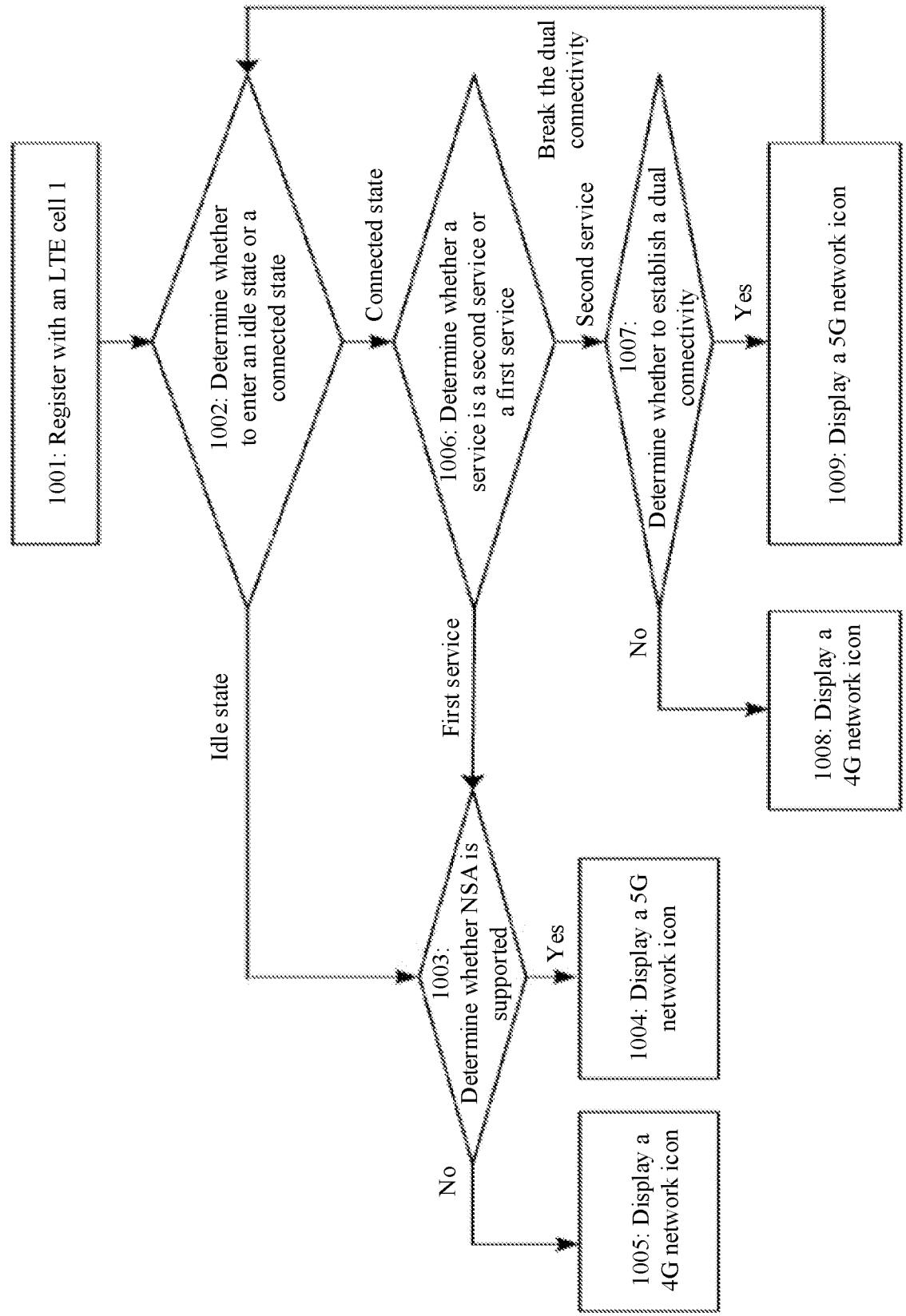
FIG. 10 is a flowchart of another network icon display method according to an embodiment of this application.

For example, FIG. 10 shows a network icon display procedure corresponding to Solution 3. The procedure may include the following steps. 1001: A mobile phone registers with an LTE cell 1. The mobile phone can register with the LTE cell 1 after being powered on, exiting an airplane mode, inserting a card, or disconnecting from a network. Alternatively, the mobile phone may be handed over from another LTE cell to the LTE cell 1, to register with the LTE cell 1.

1002: The mobile phone determines whether to enter an idle state or a connected state. Then, the mobile phone performs step 1003 or step 1006.

1003: If the mobile phone enters the idle state, the mobile phone determines whether the LTE cell 1 supports an NSA networking mode.

1004: If the LTE cell 1 supports the NSA networking mode, a mobile phone interface displays a 5G network icon.

If the LTE cell 1 supports the NSA networking mode, the LTE cell 1 may have signal coverage of an NR base station, and the mobile phone may have a dual connectivity condition, and have a capability of using a 5G network, so that the 5G network icon can be displayed.

1005: If the LTE cell does not support the NSA networking mode, a mobile phone interface displays a 4G network icon.

If the LTE cell does not support the NSA networking mode, the mobile phone can only use the 4G network but cannot use the 5G network, so that the 4G network icon can be displayed.

After step 1004 or step 1005, if the mobile phone enters the connected state, the mobile phone performs step 1006.

1006: If the mobile phone enters the connected state, the mobile phone determines whether a service that triggers the mobile phone to enter the connected state is a second service or a first service.

When the first service triggers the mobile phone to enter the connected state, the mobile phone performs steps 1003 to 1005. To be specific, when the first service triggers the mobile phone to enter the connected state, if the LTE cell 1 supports the NSA networking mode, the mobile phone interface displays the 5G network icon; or if the LTE cell 1 does not support the NSA networking mode, the mobile phone interface displays the 4G network icon.

In this way, similar to the idle state, for the connected state triggered through the first service, the mobile phone also displays the network icon based on whether the NSA networking mode is supported. Therefore, frequent switching between the 4G network icon and the 5G network icon is not likely to occur.

1007: When the second service triggers the mobile phone to enter the connected state, the mobile phone determines whether to establish a dual connectivity. Then, the mobile phone performs step 1008 or step 1009.

1008: If the mobile phone does not establish the dual connectivity, the mobile phone interface displays the 4G network icon.

If the mobile phone does not establish the dual connectivity, the mobile phone uses the 4G network and does not use the 5G network when processing a service in the connected state, so that the mobile phone interface can display the 4G network icon.

After the mobile phone exits the connected state and enters the idle state, the mobile phone performs step 1003 again.

1009: If the mobile phone establishes the dual connectivity, the mobile phone interface displays the 5G network icon.

If a network side adds an NR SCG to the mobile phone and the mobile phone establishes the dual connectivity, the mobile phone accesses an NR cell, has signal coverage of an NR base station, and may use a 5G network, so that the 5G network icon can be displayed.

Subsequently, after breaking the dual connectivity, the mobile phone may still be in the connected state, or may enter the idle state. In this case, the mobile phone displays the network icon again based on step 1002 and the following procedure.

In this way, similar to the idle state, for the connected state triggered through the first service, the mobile phone also displays the network icon based on whether the NSA networking mode is supported. Therefore, frequent switching between the 4G network icon and the 5G network icon is not likely to occur. Therefore, in Solution 3, the mobile phone does not frequently switch between the 5G network icon and the 4G network icon due to the first service, so that user experience is good.

Figure 11:
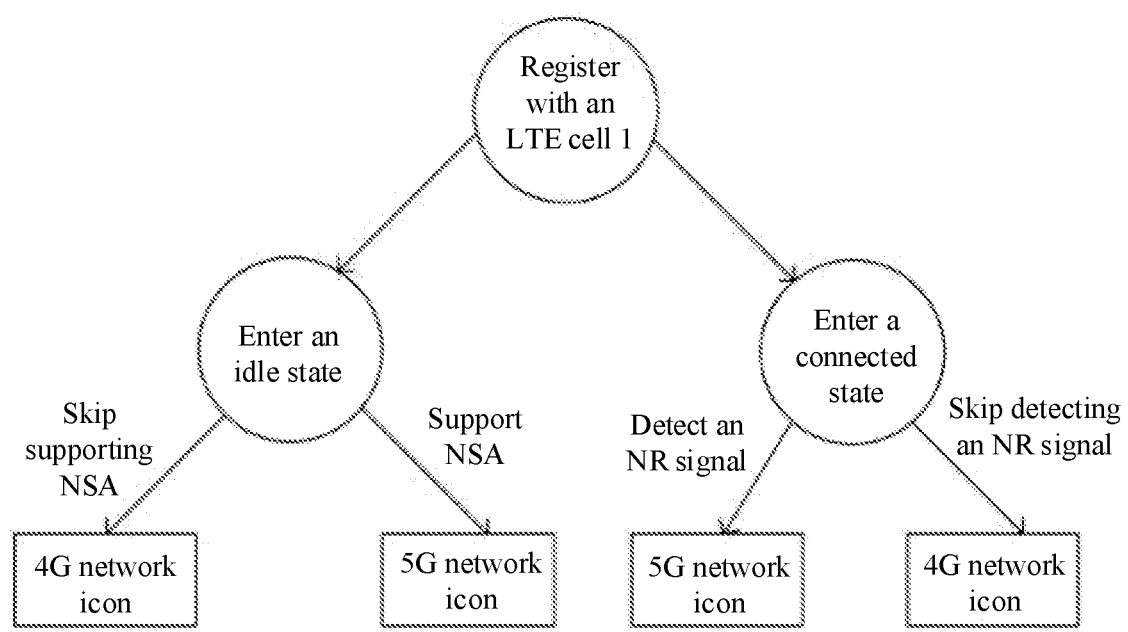
FIG. 11 is a flowchart of another network icon display method according to an embodiment of this application.

Solution 4:

Refer to FIG. 11. Solution 4 includes: A mobile phone registers with an LTE cell 1. After entering a connected state, the mobile phone detects an NR signal. If the mobile phone detects the NR signal, a mobile phone interface displays a 5G network icon. If the mobile phone does not detect the NR signal, a mobile phone interface displays a 4G network icon. After the mobile phone enters an idle state, if the LTE cell 1 supports an NSA networking mode, the mobile phone interface displays the 5G network icon; or if the LTE cell 1 does not support an NSA networking mode, the mobile phone interface displays the 4G network icon.

In Solution 4, the mobile phone may enter the connected state when processing a service (for example, a data service such as browsing a web page, watching a video, or listening to music). When the mobile phone processes the service in the connected state, if the mobile phone detects the NR signal, it indicates that a network in which the mobile phone is located has coverage of the NR signal, and the mobile phone has a 5G communication capability, and may use a 5G network, so that the 5G network icon can be displayed.

To be specific, when the mobile phone interface displays the 5G network icon, if the mobile phone is currently in the idle state, it may indicate that the LTE cell 1 supports the NSA networking mode, and the mobile phone may have signal coverage of an NR base station, may establish a dual connectivity, and may be able to use the 5G network in NSA. When the mobile phone interface displays the 5G network icon, if the mobile phone is currently in the connected state when processing the service, it may indicate that the mobile phone detects the NR signal, the network in which the mobile phone is located has the coverage of the NR signal, and the mobile phone may establish the dual connectivity, and has a capability of using the 5G network. Therefore, unlike the CONFIG D solution in which there may be a scenario in which there is no NR connection when a user actually uses the mobile phone to process a service, that is, the user actually does not use the 5G network, in Solution 4, user experience is good. In Solution 4, the 5G network icon can well match a 5G network capability of the mobile phone in the LTE cell 1, so that the 5G network icon is displayed more accurately, the display of the 5G network icon is more consistent with an actual network status of the terminal, and understanding of the user on the 5G network icon can be improved. Solution 4 may be used as an optimization solution of CONFIG D, and may be referred to as a D+ solution.

Figure 12:
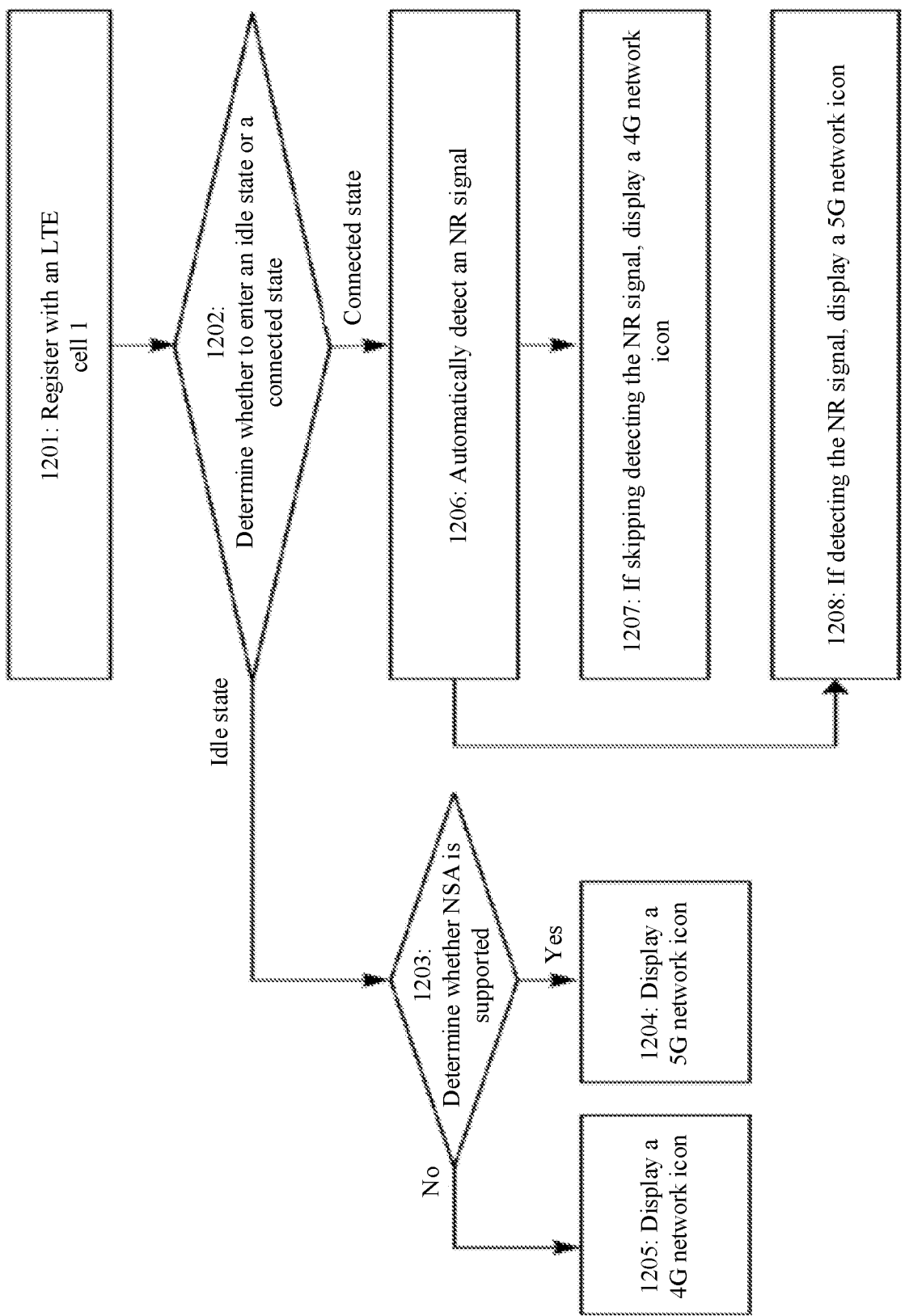
FIG. 12 is a flowchart of another network icon display method according to an embodiment of this application.

For example, FIG. 12 shows a network icon display procedure corresponding to Solution 4. The procedure may include the following steps. 1201: A mobile phone registers with an LTE cell 1.

The mobile phone can register with the LTE cell 1 after being powered on, exiting an airplane mode, inserting a card, or disconnecting from a network. Alternatively, the mobile phone may be handed over from another LTE cell to the LTE cell 1, to register with the LTE cell 1.

1202: The mobile phone determines whether to enter an idle state or a connected state. Then, the mobile phone performs step 1203 or step 1206.

1203: If the mobile phone enters the idle state, the mobile phone determines whether the LTE cell 1 supports an NSA networking mode.

1204: If the LTE cell 1 supports the NSA networking mode, a mobile phone interface displays a 5G network icon.

If the LTE cell 1 supports the NSA networking mode, the LTE cell 1 may have signal coverage of an NR base station, and the mobile phone may have a dual connectivity condition, and have a capability of using a 5G network, so that the 5G network icon can be displayed.

1205: If the LTE cell does not support the NSA networking mode, a mobile phone interface displays a 4G network icon.

If the LTE cell does not support the NSA networking mode, the mobile phone can only use the 4G network but cannot use the 5G network, so that the 4G network icon can be displayed.

After step 1204 or step 1205, if the mobile phone enters the connected state, the mobile phone performs step 1206.

1206: If the mobile phone enters the connected state, the mobile phone detects an NR signal. If the mobile phone enters the connected state, the mobile phone may automatically detect the NR signal to determine whether there is signal coverage of an NR base station.

1207: If the mobile phone does not detect the NR signal, the mobile phone displays the 4G network icon.

If the mobile phone does not detect the NR signal, the mobile phone determines that the mobile phone currently has no signal coverage of an NR base station, cannot access an NR cell, cannot establish a dual connectivity, does not have a capability of using a 5G network, so that the 4G network icon can be displayed.

1208: If the mobile phone detects the NR signal, the mobile phone displays the 5G network icon.

If the mobile phone detects the NR signal, the mobile phone determines that the mobile phone has signal coverage of an NR base station, can access an NR cell, has a dual connectivity capability, and has a capability of using a 5G network, so that the 5G network icon can be displayed.

After the mobile phone exits the connected state and enters the idle state, the mobile phone may perform step 1203 and the following procedure again.

In this solution, when the mobile phone interface displays the 5G network icon, if the mobile phone is currently in the connected state when processing the service, it may indicate that the mobile phone detects the NR signal, has the signal coverage of the NR base station, can access the NR cell, has a possibility of establishing the dual connectivity, and has the capability of using the 5G network. Therefore, unlike the CONFIG D solution in which there may be a scenario in which there is no NR connection when a user actually uses the mobile phone to process a service, that is, the user actually does not use the 5G network, in Solution 4, user experience is good.

Figure 13A:
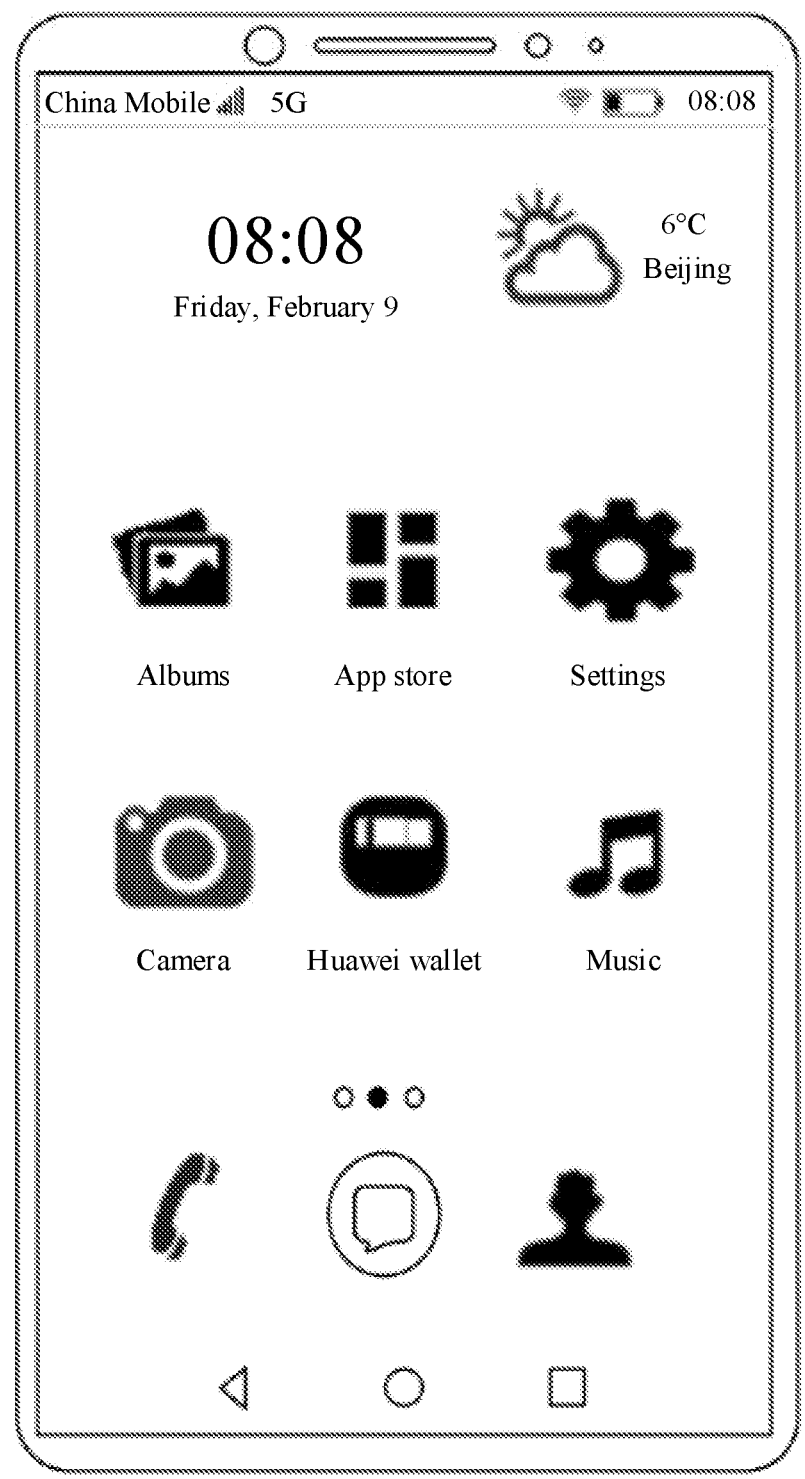
FIG. 13(a) and FIG. 13(b) are a schematic diagram of a group of interfaces for displaying network icons on a mobile phone according to an embodiment of the present application.
Figure 13B:
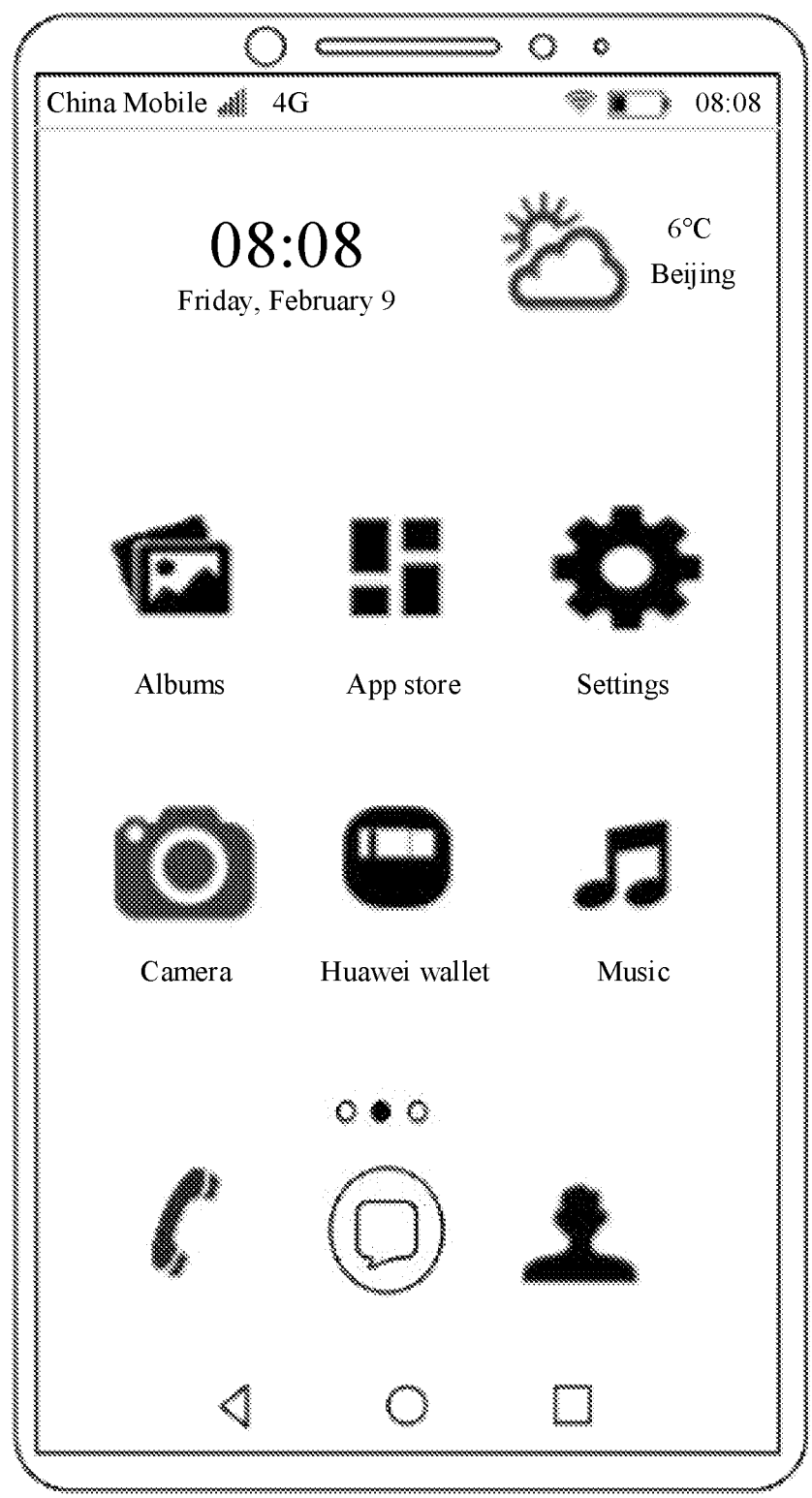

In addition, in embodiments of this application, for example, for a schematic diagram of displaying a 5G network icon in a mobile phone interface, refer to FIG. 13(*a*), and for a schematic diagram of displaying a 4G network icon in a mobile phone interface, refer to FIG. 13(*b*).

It should be noted that the network icon display method provided in embodiments of this application is described above by using an example in which the terminal is a mobile phone. When the terminal is another device, the network icon may still be displayed by using the method described in the foregoing embodiment. Details are not described herein again.

It may be understood that, to implement the foregoing functions, the terminal includes corresponding hardware and/or software modules for performing the functions. Algorithm steps in the examples described with reference to embodiments disclosed in this specification can be implemented in this application in a form of hardware or a combination of hardware and computer software. Whether the functions are performed by hardware or computer software driven hardware depends on particular applications and design constraints of the technical solutions. A person skilled in the art may use different methods to implement the described functions for each particular application with reference to embodiments, but it should not be considered that the implementation goes beyond the scope of this application.

In embodiments, the terminal may be divided into functional modules based on the foregoing method examples, for example, each functional module may be obtained through division for each corresponding function, or two or more functions may be integrated into one processing module. The integrated module may be implemented in a form of hardware.

An embodiment of this application further provides a terminal, including one or more processors and one or more memories. The one or more memories are coupled to the one or more processors. The one or more memories are configured to store computer program code. The computer program code includes computer instructions. When the one or more processors execute the computer instructions, the terminal is enabled to perform the foregoing related method steps to implement the network icon display method in the foregoing embodiments.

An embodiment of this application further provides a computer-readable storage medium. The computer-readable storage medium stores computer instructions. When the computer instructions are on a terminal, the terminal is enabled to perform the foregoing related method steps to implement the network icon display method in the foregoing embodiments.

An embodiment of this application further provides a computer program product. When the computer program product runs on a computer, the computer is enabled to perform the foregoing related steps to implement the network icon display method performed by the terminal in the foregoing embodiments.

In addition, an embodiment of this application further provides an apparatus. The apparatus may be specifically a chip, a component, or a module, and the apparatus may include a processor and a memory that are connected to each other. The memory is configured to store computer-executable instructions, and when the apparatus runs, the processor may execute the computer-executable instructions stored in the memory, so that the chip performs the network icon display method performed by the terminal in the foregoing method embodiments.

The terminal, the computer-readable storage medium, the computer program product, and the chip provided in embodiments are configured to perform the corresponding method provided above. Therefore, for beneficial effects that can be achieved by the terminal, the computer-readable storage medium, the computer program product, and the chip, refer to the beneficial effects of the corresponding method provided above. Details are not described herein again.

Another embodiment of this application provides a communications system. For an architecture of the communications system, refer to FIG. 2. The communications system may include the terminal and an access network device, and may be used to implement the network icon display method.

Based on the descriptions of the foregoing implementations, a person skilled in the art may understand that, for the purpose of convenient and brief description, only division into the foregoing functional modules is used as an example for description. In actual application, the foregoing functions can be allocated to different functional modules based on a requirement, that is, an internal structure of the apparatus is divided into different functional modules to complete all or some of the functions described above.

In the several embodiments provided in this application, it should be understood that the disclosed apparatus and method may be implemented in another manner. For example, the foregoing apparatus embodiments are merely examples. For example, division into the modules or the units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, and may be located in one position, or may be distributed in a plurality of different positions. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware or a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium, and includes several instructions for instructing a device (which may be a microcontroller, a chip, or the like) or a processor (processor) to perform all or some of the steps of the methods described in embodiments of this application. The storage medium includes any medium that can store program code such as a USB flash drive, a removable hard disk, a read-only memory (read-only memory, ROM), a random access memory (random access memory, RAM), a magnetic disk, or an optical disc.

The foregoing content is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network icon display method, implemented by a terminal, the method comprising:
   registering with a first cell, wherein the first cell is a long term evolution (LTE) cell;
   displaying a 5G network icon if a new radio secondary cell group (NR SCG) is established after registering with the first cell, wherein the 5G network icon continues to be displayed as long as the terminal camps on the first cell after the NR SCG is deleted; and
   displaying a 4G network icon if a NR SCG is not established after registering with the first cell.

2. The method of claim 1, wherein the 5G network icon continues to be displayed when the terminal is in a connected state after the NR SCG is deleted.

3. The method of claim 1, wherein the NR SCG is established by the terminal through performing random access.

4. The method of claim 1, further comprising exiting an airplane mode before registering with the first cell.

5. The method of claim 1, further comprising establishing the NR SCG after registering with the first cell when the terminal is in a connected state.

6. The method of claim 1, wherein the 4G network icon or the 5G network icon is displayed on a status bar of the terminal.

7. The method of claim 1, wherein the registering with the first cell is for a first time, the method further comprising:
registering with the first cell for a second time;
displaying the 5G network icon if a NR SCG is established after registering with the first cell for the second time; and
displaying the 4G network icon if a NR SCG is not established after registering with the first cell for the second time.

8. The method of claim 1, further comprising receiving a radio resource control (RRC) reconfiguration message to establish the NR SCG after registering with the first cell.

9. A terminal, comprising:
one or more processors;
a screen coupled to the one or more processors, wherein the screen is configured to display a network icon; and
a memory coupled to the one or more processors, wherein the memory is configured to store instructions that, when executed by the one or more processors, cause the terminal to be configured to:
register with a first cell, wherein the first cell is a long term evolution (LTE) cell;
display a 5G network icon if a new radio secondary cell group (NR SCG) is established after registering with the first cell, wherein the 5G network icon continues to be displayed as long as the terminal camps on the first cell after the NR SCG is deleted; and
display a 4G network icon if a NR SCG is not established after registering with the first cell.

10. The terminal of claim 9, wherein the 5G network icon continues to be displayed when the terminal is in a connected state after the NR SCG is deleted.

11. The terminal of claim 9, wherein the NR SCG is established by the terminal through performing random access.

12. The terminal of claim 9, wherein when the instructions are executed by the one or more processors, the terminal is further configured to exit an airplane mode before registering with the first cell.

13. The terminal of claim 9, wherein when the instructions are executed by the one or more processors, the terminal is further configured to establish the NR SCG after registering with the first cell when the terminal is in a connected state.

14. The terminal of claim 9, wherein the 4G network icon or the 5G network icon is displayed on a status bar on the display of the terminal.

15. The terminal of claim 9, wherein the registering with the first cell is for a first time, and wherein when the instructions are executed by the one or more processors, the terminal is further configured to:
register with the first cell for a second time;
display the 5G network icon if a NR SCG is established after registering with the first cell for the second time; and
display the 4G network icon if a NR SCG is not established after registering with the first cell for the second time.

16. The terminal of claim 9, wherein when the instructions are executed by the one or more processors, the terminal is further configured to receive a radio resource control (RRC) reconfiguration message to establish the NR SCG after registering with the first cell.

17. A network icon display method, implemented by a terminal, the method comprising:
registering with a first cell for a first time, wherein the terminal camps on the first cell for a first time, and the first cell is a long term evolution (LTE) cell;
displaying a 5G network icon after the terminal establishes a dual connection in the first cell, wherein the establishment of the dual connection includes the terminal establishing a new radio secondary cell group (NR SCG); and
displaying the 5G network icon after the terminal switches to a second cell as long as the terminal camps on the first cell, wherein the terminal has not yet established a dual connection in the second cell when the 5G network icon is displayed.

18. The method of claim 17, further comprising storing first information related to the first cell after the terminal establishes the dual connection in the first cell.

19. The method of claim 1, wherein the 5G network icon continues to be displayed when the terminal is in an idle state after the NR SCG is deleted.

20. The terminal of claim 9, wherein the 5G network icon continues to be displayed when the terminal is in an idle state after the NR SCG is deleted.

* * * * *